(12) United States Patent
Busbee

(10) Patent No.: US 11,470,908 B2
(45) Date of Patent: Oct. 18, 2022

(54) ARTICLES OF FOOTWEAR AND APPAREL HAVING A THREE-DIMENSIONALLY PRINTED FEATURE

(71) Applicant: Kornit Digital Technologies Ltd., Rosh HaAyin (IL)

(72) Inventor: Travis Alexander Busbee, Somerville, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 0 days.

(21) Appl. No.: 17/003,118

(22) Filed: Aug. 26, 2020

(65) Prior Publication Data

US 2021/0037908 A1 Feb. 11, 2021

Related U.S. Application Data

(63) Continuation-in-part of application No. 15/907,137, filed on Feb. 27, 2018, now Pat. No. 10,932,515.
(Continued)

(51) Int. Cl.
| | | |
|---|---|---|
| *A43B 1/14* | (2006.01) | |
| *A43B 13/04* | (2006.01) | |
| *B29L 31/50* | (2006.01) | |

(52) U.S. Cl.
CPC ............. *A43B 1/14* (2013.01); *A43B 13/04* (2013.01); *B29L 2031/50* (2013.01); *B29L 2031/504* (2013.01)

(58) Field of Classification Search
CPC ........... A43B 3/0005; A43B 3/00; A43B 7/00; A43B 17/00; A43B 7/147; A43B 13/14; A43B 13/203; A43B 23/0235; A43B 23/0275; A43B 5/001; A43B 17/006; A43B 3/001; A43B 1/0054; A43B 13/38;
(Continued)

(56) References Cited

U.S. PATENT DOCUMENTS

| | | |
|---|---|---|
| 3,053,454 A | 9/1962 | Waterfill |
| 3,982,663 A | 9/1976 | Larkin |

(Continued)

FOREIGN PATENT DOCUMENTS

| | | |
|---|---|---|
| CN | 103371564 | 10/2013 |
| CN | 103909655 A | 7/2014 |

(Continued)

OTHER PUBLICATIONS

International Search Report and Written Opinion for International Application No. PCT/US2021/047745 dated Dec. 5, 2021.
(Continued)

*Primary Examiner* — Andre J Allen

(57) ABSTRACT

The present disclosure is related to three-dimensionally printed articles for use in footwear and associated systems and methods. In some embodiments, a three-dimensionally printed article may comprise a closed-cell foam. The closed-cell foam may have a gradient in and/or may be a single integrated material. In some embodiments, a three-dimensionally printed article may comprise a sensor. The use of such arrangements can, according to certain embodiments, allow for the production of improved articles of footwear and/or customized articles of footwear.

17 Claims, 27 Drawing Sheets

Related U.S. Application Data

(60) Provisional application No. 62/555,916, filed on Sep. 8, 2017, provisional application No. 62/555,904, filed on Sep. 8, 2017, provisional application No. 62/555,897, filed on Sep. 8, 2017, provisional application No. 62/464,364, filed on Feb. 27, 2017.

(58) Field of Classification Search
CPC ......... A43B 17/02; A43B 17/03; A43B 23/24; A43B 3/0078; A43B 5/00; A43B 7/144; A43B 13/386; A43B 7/141; A43B 7/142; A43B 7/1445; A43B 11/00; A43B 13/00; A43B 13/125; A43B 13/18; A43B 13/183; A43B 13/20; A43B 13/206; A43B 17/026; A43B 21/26; A43B 23/00; A43B 3/0015; A43B 3/0089; A43B 5/06; A43B 7/1455; A43B 7/24; A43B 7/28; A43B 13/04; A43B 13/12; A43B 13/141; A43B 13/189; A43B 13/22; A43B 17/003; A43B 3/0021; A43B 3/0031; A43B 3/16; A43B 7/1425; A43B 7/1435; A43B 7/145
USPC .......................................................... 73/172
See application file for complete search history.

(56) References Cited

U.S. PATENT DOCUMENTS

| | | |
|---|---|---|
| 4,078,576 A | 3/1978 | Punch et al. |
| 4,708,292 A | 11/1987 | Gammons |
| 5,335,992 A | 8/1994 | Holl |
| 5,385,953 A | 1/1995 | McClellan |
| 5,820,354 A | 10/1998 | Wild et al. |
| 5,979,787 A | 11/1999 | Scarpa |
| 8,333,330 B2 | 12/2012 | Schuetze et al. |
| 8,758,263 B1 | 6/2014 | Rahimian et al. |
| 9,375,051 B2 | 6/2016 | Doremus et al. |
| 9,421,565 B2 | 8/2016 | Lewis et al. |
| 9,453,142 B2 | 9/2016 | Rolland et al. |
| 9,491,987 B2 | 11/2016 | Antonelli et al. |
| 10,076,876 B2 | 9/2018 | Mark et al. |
| 10,119,108 B2 | 11/2018 | Maggiore |
| 10,254,499 B1 | 4/2019 | Cohen et al. |
| 10,442,910 B2 | 10/2019 | Baghdadi et al. |
| 10,716,358 B2 | 7/2020 | Reinhardt et al. |
| 10,932,515 B2 * | 3/2021 | Busbee ................. B29C 64/336 |
| 2004/0126254 A1 | 7/2004 | Chen et al. |
| 2004/0187714 A1 | 9/2004 | Napadensky et al. |
| 2006/0035034 A1 | 2/2006 | Matsumoto et al. |
| 2006/0283044 A1* | 12/2006 | Lacey .................. A43B 13/188 36/28 |
| 2008/0026190 A1 | 1/2008 | King et al. |
| 2008/0132597 A1 | 6/2008 | Nozawa et al. |
| 2009/0143765 A1 | 6/2009 | Slocum et al. |
| 2010/0140852 A1 | 6/2010 | Kritchman et al. |
| 2011/0189785 A1 | 8/2011 | Gutmann et al. |
| 2011/0315291 A1 | 12/2011 | Abad et al. |
| 2012/0260527 A1* | 10/2012 | Noh ......................... A43B 7/20 36/85 |
| 2013/0320598 A1 | 12/2013 | Atkins et al. |
| 2014/0020191 A1 | 1/2014 | Jones et al. |
| 2014/0020192 A1 | 1/2014 | Jones et al. |
| 2014/0027952 A1 | 1/2014 | Fan et al. |
| 2014/0137965 A1 | 5/2014 | Truitt et al. |
| 2014/0182170 A1 | 7/2014 | Wawrousek et al. |
| 2015/0230562 A1 | 8/2015 | Jones et al. |
| 2015/0336298 A1 | 11/2015 | Dean |
| 2015/0352787 A1 | 12/2015 | Humbert et al. |
| 2016/0021969 A1 | 1/2016 | Lettow, II et al. |
| 2016/0107396 A1 | 4/2016 | Berman |
| 2016/0192741 A1 | 7/2016 | Mark |
| 2016/0205963 A1 | 7/2016 | Saal et al. |
| 2016/0219982 A1 | 8/2016 | Waatti |
| 2016/0235158 A1* | 8/2016 | DesJardins ............ A43B 13/20 |
| 2016/0299047 A1 | 10/2016 | Molla et al. |
| 2016/0331082 A1* | 11/2016 | Weidl ........................ A43B 3/26 |
| 2016/0374428 A1 | 12/2016 | Kormann et al. |
| 2016/0374431 A1 | 12/2016 | Tow |
| 2017/0050374 A1 | 2/2017 | Minardi et al. |
| 2017/0122322 A1 | 5/2017 | Zinniel et al. |
| 2017/0164899 A1 | 6/2017 | Yang et al. |
| 2017/0203406 A1 | 7/2017 | Ganapathiappan et al. |
| 2017/0238870 A1 | 8/2017 | Lee et al. |
| 2017/0251713 A1 | 9/2017 | Warner et al. |
| 2017/0265582 A1 | 9/2017 | Walker et al. |
| 2017/0319368 A1 | 11/2017 | Selner |
| 2018/0029291 A1 | 2/2018 | Matzner et al. |
| 2018/0133670 A1 | 5/2018 | Lewis et al. |
| 2018/0353308 A1 | 12/2018 | Tompkins |
| 2018/0369910 A1 | 12/2018 | Gunther et al. |
| 2019/0037960 A1 | 2/2019 | Busbee et al. |
| 2019/0037961 A1 | 2/2019 | Busbee et al. |
| 2019/0037969 A1 | 2/2019 | Busbee et al. |
| 2019/0039299 A1 | 2/2019 | Busbee et al. |
| 2019/0039309 A1 | 2/2019 | Busbee et al. |
| 2019/0039310 A1* | 2/2019 | Busbee ................. A43B 13/026 |
| 2019/0039311 A1 | 2/2019 | Busbee et al. |
| 2019/0200703 A1* | 7/2019 | Mark ..................... B33Y 80/00 |
| 2019/0246741 A1 | 8/2019 | Busbee et al. |
| 2019/0248089 A1* | 8/2019 | Busbee ................. A41C 3/128 |
| 2019/0283394 A1 | 9/2019 | Ashcroft et al. |
| 2019/0322884 A1* | 10/2019 | Bloomfield ........... C08F 232/08 |
| 2019/0387839 A1 | 12/2019 | Dua et al. |
| 2021/0039306 A1 | 2/2021 | Busbee et al. |
| 2021/0039399 A1 | 2/2021 | Busbee |
| 2021/0186151 A1* | 6/2021 | Gross ................... A43B 1/0009 |
| 2021/0321713 A1 | 10/2021 | Busbee |
| 2022/0000212 A1 | 1/2022 | Busbee |

FOREIGN PATENT DOCUMENTS

| | | | |
|---|---|---|---|
| CN | 104191616 A | 12/2014 | |
| CN | 104428126 | 3/2015 | |
| CN | 104786506 A | 7/2015 | |
| CN | 104875389 A | 9/2015 | |
| CN | 105073363 | 11/2015 | |
| CN | 105142450 | 12/2015 | |
| CN | 205058637 U | 3/2016 | |
| CN | 205741716 U | 11/2016 | |
| CN | 106331236 A | 1/2017 | |
| CN | 110431000 | 11/2019 | |
| CN | 113271803 A * | 8/2021 | ............. A43B 13/04 |
| EP | 3061545 | 8/2016 | |
| GB | 2508204 | 5/2014 | |
| WO | WO-2016170030 A1 * | 10/2016 | ......... A43B 23/0235 |
| WO | 2016/191329 | 12/2016 | |
| WO | 2016/209872 | 12/2016 | |
| WO | WO-2018115874 A1 * | 6/2018 | ........... A43B 13/186 |
| WO | WO 2018/144121 | 8/2018 | |
| WO | WO-2018157146 A1 * | 8/2018 | ............... A43D 1/00 |
| WO | WO 2022/047020 | 3/2022 | |

OTHER PUBLICATIONS

International Search Report and Written Opinion for International Application No. PCT/US2021/047738 dated Dec. 9, 2021.
[No Author Listed], Amtel restructuring—again. Rubber News. Sep. 8, 2009. 4 pages.
Bauman, Surface-modified rubber particles for polyurethanes. Plastic Additives. Polymer Science and Technology Series. 1998;1:584-9.
Piszczyk et al., Polyurethane/ground tire rubber composite foams based on polyglycerol: Processing, mechanical and thermal properties. Journal of Reinforced Plastics and Composites. 2015; 10 pages.
Sanjay, Effect of Crumb-Rubber Particle Size on Mechanical Response of Polyurethane Foam Composites. Oklahoma State University Masters Thesis. Jul. 2014. 55 pages.
Shan et al., Study of Flexible Polyurethane Foams Reinforced with Coir Fibres and Tyre Particles. International Journal of Applied Physics and Mathematics. 2012;2:123.

(56) References Cited

OTHER PUBLICATIONS

Subramaniyan et al., Mechanical Behavior of Polyurethane Composite Foams from Kenaf Fiber and Recycled Tire Rubber Particles. Applied Mechanics and Materials. 2013;315:861-6. Epub Apr. 10, 2013.
U.S. Appl. No. 15/907,122, filed Feb. 27, 2018, Busbee et al.
U.S. Appl. No. 15/907,128, filed Feb. 27, 2018, Busbee et al.
U.S. Appl. No. 15/907,160, filed Feb. 27, 2018, Busbee et al.
U.S. Appl. No. 15/907,147, filed Feb. 27, 2018, Busbee et al.
U.S. Appl. No. 17/188,490, filed Mar. 1, 2021, Busbee.
U.S. Appl. No. 15/907,085, filed Feb. 27, 2018, Busbee et al.
U.S. Appl. No. 15/907,100, filed Feb. 27, 2018, Busbee et al.
U.S. Appl. No. 17/003,089, filed Aug. 26, 2020, Busbee.
U.S. Appl. No. 17/003,106, filed Aug. 26, 2020, Busbee.
U.S. Appl. No. 17/320,094, filed May 13, 2021, Busbee.
PCT/US2021/047745, Dec. 2, 2021, International Search Report and Written Opinion.
PCT/US2021/047738, Dec. 9, 2021 International Search Report and Written Opinion.
Notice of Allowance dated Dec. 9, 2020 From the US Patent and Trademark Office Re. U.S. Appl. No. 15/907,137. (13 Pages).
Notification of Office Action and Search Report dated Aug. 25, 2021 From the State Intellectual Property Office of the People's Republic of China Re. Application No. 201880027271.2 audits Translation of Office Action Into English. (52 Pages).
Official Action dated Apr. 3, 2020 From the US Patent and Trademark Office Re. U.S. Appl. No. 15/907,160. (28 Pages).
Official Action dated Oct. 7, 2019 From the US Patent and Trademark Office Re. U.S. Appl. No. 15/907,147. (9 Pages).
Official Action dated Feb. 17, 2022 From the US Patent and Trademark Office Re. U.S. Appl. No. 15/907,147. (12 Pages).
Official Action dated May 18, 2020 From the US Patent and Trademark Office Re. U.S. Appl. No. 15/907,137. (9 Pages).
Official Action dated Jul. 24, 2020 From the US Patent and Trademark Office Re. U.S. Appl. No. 15/907,147. (7 Pages).
Official Action dated Jan. 25, 2021 From the US Patent and Trademark Office Re. U.S. Appl. No. 15/907,160. (29 Pages).
Official Action dated Aug. 27, 2021 From the US Patent and Trademark Office Re. U.S. Appl. No. 15/907,160, (12 Pages).
Official Action dated Apr. 29, 2021 From the US Patent and Trademark Office Re. U.S. Appl. No. 15/907,147. (7 Pages).
Restriction Official Action dated Feb. 14, 2020 From the US Patent and Trademark Office Re. U.S. Appl. No. 15/907,137. (7 Pages).
Supplementary European Search Report and the European Search Opinion dated Nov. 6, 2020 From the European Patent Office Re. Application No. 18757136.9. (lOPages).
Notification of Office Action and Search Report dated Jun. 16, 2022 From the China National Intellectual Property Administration Re. Application No. 201880027271.2 and Its Translation Into English. (29 Pages).
Cao et al. "Material Modem Design Theory and Method", Harbin Institute of Technology Press, p. 7, Apr. 30, 2002.

\* cited by examiner

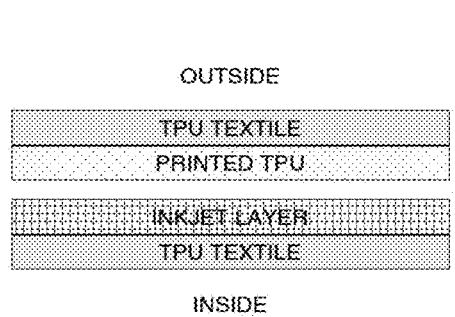
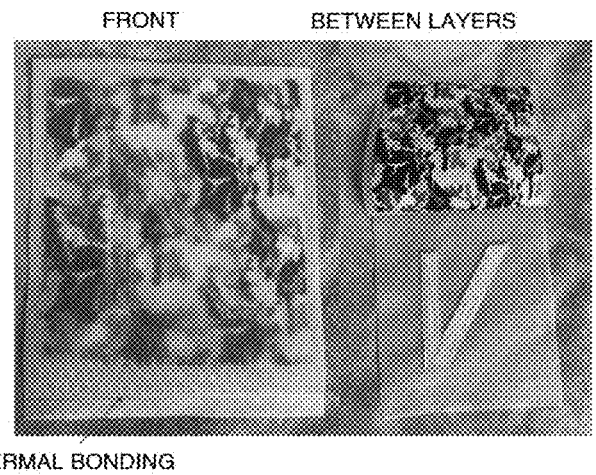
FIG. 24A  FIG. 24B
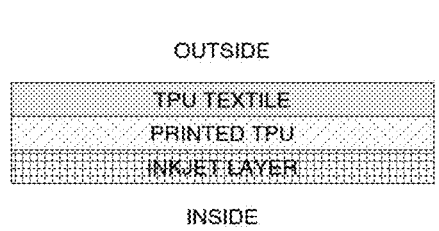
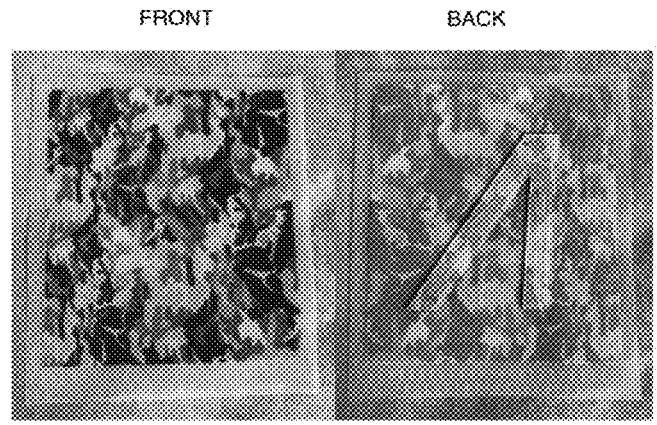
FIG. 25A  FIG. 25B

ARTICLES OF FOOTWEAR AND APPAREL HAVING A THREE-DIMENSIONALLY PRINTED FEATURE

RELATED APPLICATIONS

This application is a continuation-in-part of U.S. application Ser. No. 15/907,137 filed Feb. 27, 2018, which claims the benefit of priority under 35 U.S.C. § 119(e) to U.S. Provisional Application No. 62/464,364 filed Feb. 27, 2017, U.S. Provisional Application No. 62/555,897 filed Sep. 8, 2017, U.S. Provisional Application No. 62/555,904 filed Sep. 8, 2017 and U.S. Provisional Application No. 62/555,916 filed Sep. 8, 2017, all of which are incorporated herein by reference in their entirety for all purposes.

FIELD

The present invention relates generally to three-dimensionally printed articles for use in footwear and associated systems and methods.

BACKGROUND

Footwear is typically mass produced from in large batches and with the use of complex supply chains. As a result, portions of a single article of footwear with different properties are typically formed from uniform components with standard sizes and properties which are adhered together or disposed on one another. This lowers the quality of the resultant footwear and makes its customization for specific users challenging. Accordingly, improved articles for use in footwear that allow greater integration and/or customization of different components and associated methods may be advantageous.

SUMMARY

The present invention generally relates to systems and methods involving three-dimensionally printed articles for use in footwear. The present subject matter of the present invention involves, in some cases, interrelated products, alternative solutions to a particular problem, and/or a plurality of different uses of one or more systems and/or articles.

In one set of embodiments, three-dimensionally printed (3D-printed) articles for use in footwear are provided. The 3D-printed article may have a gradient in a property between a first portion and a second portion. In some embodiments, the property may be selected from the group consisting of stiffness, Shore A hardness, microindentation hardness, nanoindentation hardness, pore size, density, color, surface roughness, reflectivity, strength, elongation at break, tensile elastic modulus, modulus at 100% strain, opacity, and dimensional change upon heat activation. In some embodiments, the 3D-printed article may be a single integrated material.

In some embodiments, the 3D-printed articles for use in footwear may be selected to have a particular material composition, such that they can be recycled together with other parts of a shoe. In some embodiments, a textile for a footwear upper, and a 3D-printed article at least partially disposed on top of the textile, may comprise substantially the same raw material (e.g. thermoplastic polyurethane (TPU)). In some embodiments, the 3D-printed article, the upper textile, and at least a portion of the bottom of the shoe (e.g., midsole, insole, outsole) may comprise the same raw material. In some cases, these materials may all be thermoplastics.

In another set of embodiments, a 3D-printed article for use in footwear may be printed as a separate article and then subsequently be inserted, glued, or assembled into and/or onto another part of the article of footwear. In some embodiments, the 3D-printed article may have at least a portion that is an open-celled or closed-celled lattice structure. In some embodiments, the article may comprise substantially the same material as in other parts of the shoe (e.g., TPU).

In some embodiments, a method may comprise 3D-printing an article having a gradient in a property between a first portion and a second portion. The property may be a mechanical property. The article may be a single integrated material.

In some embodiments, a method may comprise 3D-printing an article having a gradient in a property between a first portion and a second portion. The property may be an optical property. The article may be a single integrated material.

In some embodiments, a method may comprise 3D-printing an article having a gradient in a property between a first portion and a second portion. The property may be a structural property. The article may be a single integrated material.

In some embodiments, a 3D-printed article for use in footwear may comprise a plurality of sensors. In some embodiments, the sensors may be pressure sensors.

In another set of embodiments, methods are provided. A method may comprise 3D-printing an article having a gradient in a property between a first portion and a second portion. In some embodiments, the property may be selected from the group consisting of stiffness, Shore A hardness, microindentation hardness, nanoindentation hardness, pore size, and density. In some embodiments, the article may be a single integrated material.

In some embodiments, a method for designing a personalized 3D-printed article for use in footwear may comprise acquiring information from a plurality of pressure sensors distributed within a first 3D-printed article. The method may also comprise printing a second 3D-printed article having a gradient in a property based on the information. In some embodiments, the property may be selected from the group consisting of stiffness, Shore A hardness, microindentation hardness, nanoindentation hardness, pore size, and density.

In one aspect, articles are provided. In some embodiments, an article may be an article of footwear. In some embodiments, the article of footwear comprises an upper. The upper may comprise a textile or polymer film. The upper may comprise a three-dimensionally printed feature, e.g., comprising a thermoplastic material. In some embodiments, the three-dimensionally printed feature is directly attached to the textile or polymer film. In some embodiments, the majority of the weight of the upper comprises substantially the same thermoplastic material as that of the three-dimensionally printed feature. In some embodiments, the three-dimensionally printed feature comprises a first portion and a second portion, wherein there is at least a 10% difference in microindentation hardness between the first portion and the second portion.

In some embodiments, the three-dimensionally printed feature has a gradient in one or more material properties. In some embodiments, each of the one or more material properties is selected from the group consisting of: stiffness, tensile elastic modulus, Shore A hardness, Shore D hardness, microindentation hardness, nanoindentation hardness, flexural modulus, and color. In some embodiments, the three-dimensionally printed feature has a gradient in one or more additional material properties. In some embodiments, each of the one or more additional material properties is selected from the group consisting of: stiffness, tensile elastic modulus, Shore A hardness, Shore D hardness, nanoindentation hardness, flexural modulus, and color. In some embodiments, at least one of the one or more material properties differs by at least 10% between a first portion and a second portion of the three-dimensionally printed feature. In some embodiments, the three-dimensionally printed feature has at least one section that is a single integrated material. In some embodiments, the three-dimensionally printed feature has a section that is a single integrated material, and the section has the first portion and the second portion. In some embodiments, the three-dimensionally printed feature comprises a first portion and a second portion. In some embodiments, there is at least a 10% difference in tensile elastic modulus between the first portion and the second portion. In some embodiments, there is at least a 10% difference in Shore A hardness between the first portion and the second portion.

In some embodiments, the majority of the weight of the entire footwear article comprises substantially the same thermoplastic material as that of the three-dimensionally printed feature. In some embodiments, the majority of the weight of the entire footwear article consists of substantially the same thermoplastic material as that of the three-dimensionally printed feature. In some embodiments, the three-dimensionally printed feature comprises at least a section that is a single integrated material and has a gradient in tensile elastic modulus between the first portion and the second portion. In some embodiments, the three-dimensionally printed feature is attached to the textile or film without the use of an adhesive.

In some embodiments, at least a portion of the upper has a pigment containing inkjet ink disposed on at least one surface of the upper. In some embodiments, the pigment containing inkjet ink is disposed on an internal surface of a first textile, wherein the internal surface is at least partially visible through at least the first textile that is at least partially transparent. In some embodiments, the pigment containing inkjet ink is disposed on an internal surface of a first textile, wherein the internal surface is at least partially visible through a second textile that is at least partially optically transparent. In some embodiments, the pigment containing inkjet ink is disposed on an internal surface of a first textile, wherein the internal surface is at least partially visible through at least the first textile that is at least partially transparent. In some embodiments, the pigment containing inkjet ink may also be partially visible through a second textile that is also at least partially optically transparent. In some embodiments, the three-dimensionally printed feature is at least partially transparent, and the three-dimensionally printed feature has a pigment containing inkjet ink disposed on the feature.

In some embodiments, the thermoplastic material which the majority of the weight of the upper comprises is a thermoplastic polyurethane.

In some embodiments, at least a portion of the three-dimensionally printed feature is an open-celled lattice. In some embodiments, at least a portion of the three-dimensionally printed feature is a closed-celled lattice. In some embodiments, the three-dimensionally printed feature comprises a gradient in tensile elastic modulus. In some embodiments, the first portion has a Shore A hardness below 75 A, and the second portion has a Shore A hardness greater than 85 A; and wherein the three-dimensionally printed feature is a single integrated material.

In some embodiments, the three-dimensionally printed feature comprises a thermoplastic polyurethane.

In some embodiments, the majority of the weight of the upper consists of substantially the same thermoplastic material as that of the three-dimensionally printed feature.

In some embodiments, an article may be an article of apparel. In some embodiments, the article of apparel comprises a textile or polymer film. In some embodiments, the article of apparel comprises a three-dimensionally printed feature comprising a thermoplastic material. In some embodiments, the three-dimensionally printed feature is directly attached to the textile or polymer film. In some embodiments, the majority of the weight of the article of apparel comprises substantially the same thermoplastic material as that of the three-dimensionally printed feature. In some embodiments, the three-dimensionally printed feature comprises a first portion and a second portion, wherein there is at least a 10% difference in microindentation hardness between the first portion and the second portion.

In some embodiments, the three-dimensionally printed feature has a gradient in one or more material properties. In some embodiments, each of the one or more material properties is selected from the group consisting of: stiffness, tensile elastic modulus, Shore A hardness, Shore D hardness, microindentation hardness, nanoindentation hardness, flexural modulus, and color. In some embodiments, at least one of the one or more material properties differs by at least 10% between a first portion and a second portion of the three-dimensionally printed feature. In some embodiments, the three-dimensionally printed feature has at least one section that is a single integrated material. In some embodiments, the three-dimensionally printed feature has a section that is a single integrated material, and the section has the first portion and the second portion. In some embodiments, the three-dimensionally printed feature comprises a first portion and a second portion. In some embodiments, there is at least a 10% difference in tensile elastic modulus between the first portion and the second portion. In some embodiments, there is at least a 10% difference in Shore A hardness between the first portion and the second portion.

In some embodiments, the textile or polymer film is not three-dimensionally printed. In some embodiments, the thermoplastic material which the majority of the weight of the article of apparel comprises is a thermoplastic polyurethane.

In some embodiments, the majority of the weight of the article of apparel consists of substantially the same thermoplastic material as that of the three-dimensionally printed feature.

In some embodiments, an article of footwear comprises a three-dimensionally printed feature comprising an open-celled lattice. In some embodiments, an article of footwear comprises a three-dimensionally printed feature comprising a closed-celled lattice. In some embodiments, the article of footwear comprises a closed cell foam. In some embodiments, the three-dimensionally printed feature is at least partially embedded inside of the closed cell foam. In some embodiments, at least a portion of the open-celled lattice has an Asker C hardness less than Asker C 55. In some embodiments, at least a portion of the open-celled lattice has an Asker C hardness less than Asker C 50.

In some embodiments, the closed cell foam is not three-dimensionally printed.

In some embodiments, the three-dimensionally printed feature comprises a first portion and a second portion, wherein there is at least a 10% difference in compression force deflection between the first portion and the second portion.

In some embodiments, the three-dimensionally printed feature is an insert into the closed cell foam and the closed cell foam is a portion of the article of footwear selected from the group consisting of: midsole, outsole, insole, sockliner, and footbed.

In some embodiments, the three-dimensionally printed feature comprises a thermoplastic material, and the thermoplastic material has substantially the same composition as the material which the majority of the weight of the remainder of the shoe comprises. In some embodiments, the three-dimensionally printed feature comprises a thermoplastic material, and the thermoplastic material has substantially the same composition as the material of which the majority of the weight of the remainder of the shoe consists. In some embodiments, the three-dimensionally printed feature comprises a thermoplastic polyurethane, a polyurea, or a combination of the two, and wherein the three-dimensionally printed feature composition comprises at least 15% by weight of raw materials that are derived from organisms of the plant kingdom.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 23A-26B show several illustrative examples and photographs of various layer configurations for textiles, inkjet inks, and 3D printed articles, in accordance with some embodiments;

DETAILED DESCRIPTION

Figure 1A:
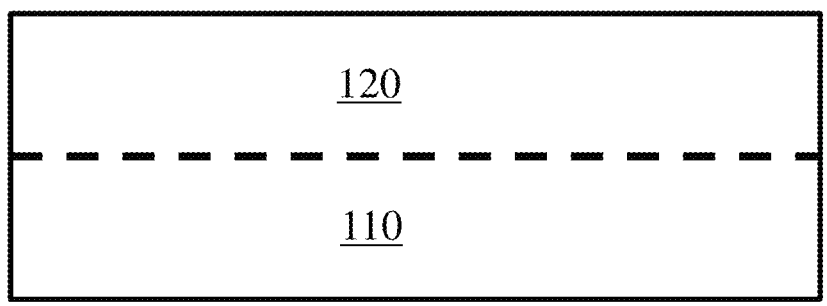
FIGS. 1A-1C illustrate 3D-printed articles according to certain embodiments of the invention.
Figure 1B:
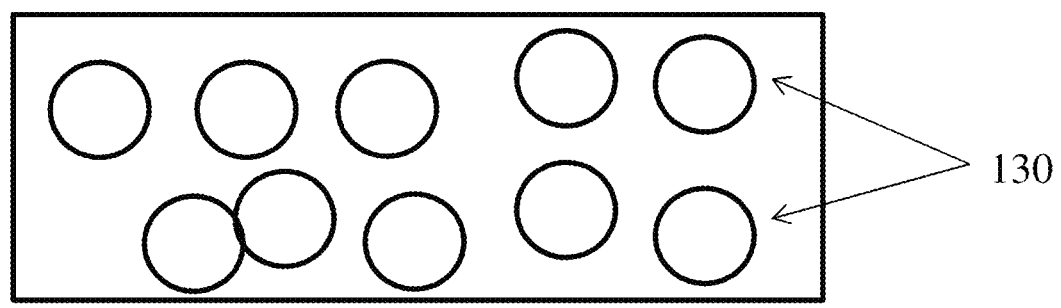

Inventive three-dimensionally printed (3D-printed) articles for use in footwear or other applications, and associated methods, are generally described herein. In some embodiments, the 3D-printed article may comprise one or more features that are challenging or impossible to obtain in articles manufactured by other techniques. As an example, the 3D-printed article may be a single integrated material which comprises a gradient in one or more properties (e.g., pore size, density, stiffness, stiffness of solid components of the article, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, breathability) between two or more portions of the material. This may be achieved using a 3D printing process by printing the 3D-printed article using an ink that can be dynamically changed as the article is printed (by, e.g., changing the ratios of different components that make up the ink or polymer that is deposited, changing the temperature of the ink, and the like). In some embodiments, the 3D-printed article may have one or more features that are preferred by users of the 3D-printed article or footwear of which the 3D-printed article is one component. For example, the 3D-printed article may be a single integrated material and/or may lack seams, adhesives, and other features that are typically used to join two or more materials together. In some embodiments, the 3D-printed article may have an open-celled lattice architecture that may have a different feel or performance attributes, and the article would be unreasonably difficult or impossible to fabricate through molding processes. In some embodiments, the 3D-printed article may have a closed-celled lattice architecture that may have a different feel or performance attributes, and the article would be unreasonably difficult or impossible to fabricate through molding processes. These and other 3D-printed articles may be more comfortable for users, and/or may be less subject to degradation or damage during normal usage of the article.

It should be understood that references herein to 3D-printed articles may encompass articles that include more than one layer (e.g., articles that comprise multiple layers printed on top of each other) and/or may encompass articles that include a single layer (e.g., articles in which a single layer of material has been printed). 3D-printed articles may encompass articles printed from 3D-printers and/or articles that extend macroscopically in three dimensions (e.g., with a minimal extent in each dimension of 50 microns, 100 microns, 200 microns, 500 microns, or 1 mm). Similarly, 3D-printing may encompass printing articles that include more than one layer and/or printing articles that include a single layer. 3D-printing may encompass printing articles on 3D-printers, printing articles extend macroscopically in three dimensions (e.g., with a minimal extent in each dimension of 50 microns, 100 microns, 200 microns, 500 microns, or 1 mm).

It should also be understood that articles other than 3D-printed articles and printing methods other than 3D-printing are also contemplated. For example, some embodiments relate to articles that have one or more of the features of the 3D-printed articles described herein (e.g., a gradient in one or more properties) but are not 3D-printed articles. Some articles may include both one or more 3D-printed components and one or more non-3D-printed components. Similarly, some embodiments relate to methods that have one or more features of the methods described herein (e.g., may comprise employing a multi-axis deposition system) but which do not include a 3D-printing step. Some methods may include both one or more 3D-printing steps and one or more non-3D-printing steps.

Certain methods (e.g., methods including exclusively 3D-printing steps, methods including exclusively non-3D printing steps, methods including both 3D-printing steps and non-3D-printing steps) comprise depositing one or more film(s) onto a 3D-surface. Some or all of the films, if more than one are deposited, may be thin film(s).

Certain methods (e.g., methods including exclusively 3D-printing steps, methods including exclusively non-3D printing steps, methods including both 3D-printing steps and non-3D-printing steps) comprise depositing a material that does not form a film on a substrate. For instance, a material may be deposited onto a substrate into which it infiltrates. As an example, a material may be deposited onto a porous substrate (e.g., a porous textile) and then infiltrate into at least a portion of the pores of the porous substrate. After it has been deposited onto the porous substrate, it may fill a portion of the pores of the porous substrate. The material may enhance the mechanical properties of the substrate. In some embodiments, a material deposited onto a substrate into which it infiltrates, such as a porous substrate, does not extend an appreciable distance (or at all) beyond the surface of the porous substrate.

In one set of embodiments, one or more methods for manufacturing 3D-printed articles as described herein may be advantageous in comparison to other methods for making articles for use in footwear. For example, a footwear manufacturer employing a method as described herein may be able to use fewer processes to create the article than would be employed in other comparable processes (e.g., the manufacturer may use a three-dimensional printer (3D printer) in a single process to make a component that would otherwise be made by a combination of several processes such as injection molding, lamination, and the like). This may allow for more rapid and/or more facile manufacturing. As another example, one or more of the methods described herein may not necessarily require the use equipment that is expensive to manufacture and whose cost is typically recovered only after repeated use (e.g., molds). Some of the methods described herein may instead employ a 3D printer to create articles whose design can be modified as desired with little or no added cost. In some embodiments, it may be economical for methods as described herein to create small batches of 3D-printed articles (e.g., batches of less than 100, less than 50, or less than 10). It is thus possible for manufacturers may employ some of the methods described herein to respond to changing market conditions, to create articles for use in footwear that are designed for individual users or groups of users, etc. In some embodiments, it may be advantageous to use one or more of the methods described herein to fabricate a 3D-printed article at the point of sale and/or to avoid long distance shipping. In some embodiments, it may be advantageous to use one or more of the methods described herein to fabricate a 3D-printed article with enhanced performance that could not, or at least could not reasonably, be fabricated through molding methods.

A non-limiting example of a 3D-printed article for use in footwear is shown in FIG. 1A. In this figure, 3D-printed article 100 comprises first portion 110 and second portion 120. As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

Portions of an article may have any suitable size. In some embodiments, a portion may have a largest dimension and/or may comprise one or more features with a size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, a portion may have a largest dimension and/or may comprise one or more features with a size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

In some embodiments, a 3D-printed article may comprise two or more portions, where one or more properties (e.g., average pore size, density, stiffness, stiffness of solid components of the article, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, breathability) of a first portion may differ from one or more properties of a second portion. The one or more properties may be structural properties (e.g., average pore size, density, surface roughness, filler content), chemical properties (e.g., average degree of cross-linking, chemical composition), mechanical properties (e.g., average stiffness, stiffness of solid components, Shore A hardness, microindentation hardness, nanoindentation hardness, abrasion resistance, stiffness anisotropy, elastic modulus, flexural modulus, strength, elongation at break, tensile elastic modulus, modulus at 100% strain), optical properties (e.g., color, opacity, reflectivity), and/or other properties (e.g., average thermal conductivity, electrical conductivity, conductivity, breathability, dimensional change upon heat activation). In some embodiments, the difference in properties between the first portion and the second portion may comprise a gradient of the one or more properties (e.g., the property or properties may vary relatively smoothly from a first value in the first portion to a second value in the second portion). In other embodiments, there may be a sharp change in one or more of the properties at a boundary of one or more of the first portion and the second portion.

It should be understood that while FIG. 1A shows the second portion positioned above the first portion, other arrangements of the first portion with respect to the second portion are also contemplated. For example, the first portion may be positioned beside the second portion, the first portion may surround the second portion, the first portion and the second portion may interpenetrate (e.g., a first portion may comprise a foam that interpenetrates with a second portion that comprises an elastomer), etc. It should also be noted that while FIG. 1A shows the second portion directly adjacent the first portion, this configuration should not be understood to be limiting. In some embodiments, the first portion may be separated from the second portion by one or more intervening portions positioned between the first portion and the second portion. As used herein, a portion that is positioned "between" two portions may be directly between the two portions such that no intervening portion is present, or an intervening portion may be present.

Similarly, while FIG. 1A only depicts two portions, it should also be understood that an article may comprise three portions, four portions, or more portions. In some embodiments, portions within a 3D-printed article as described herein may also further comprise sub-portions. Each portion and/or sub-portion may differ from each other (sub-)portion in at least one way (e.g., any two (sub-)portions may comprise at least one property that is different), or one or more (sub-)portions may be substantially similar to other (sub-)portion(s) of the 3D-printed article.

In some embodiments, two or more portions may be disposed relative to each other such that they may be connected by a pathway along which the 3D-printed article lacks an interface along which one or more properties (e.g., average pore size, density, stiffness, stiffness of solid components of the article, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes. In other words, the property or properties may vary smoothly along the pathway. The pathway may be a straight path pathway (e.g., it may be a line segment), or it may include one or more curves or corners (e.g., it may be a meander, as described more fully below). In some embodiments, the pathway may be a pathway along which material was deposited during formation of the 3D-printed article, such as a pathway travelled by a print head (or by a substrate with respect to the print head) during 3D-printing.

When two or more portions are connected by a pathway, the pathway may have any suitable length. In some embodiments, the pathway has a length of greater than or equal to 0.5 mm, greater than or equal to 1 mm, greater than or equal to 2 mm, greater than or equal to 5 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1 m, greater than or equal to 2 m, or greater than or equal to 5 m. In some embodiments, the pathway has a length of less than or equal to 10 m, less than or equal to 5 m, less than or equal to 2 m, less than or equal to 1 m, less than or equal to 500 mm, less than or equal to 200 mm, less than or equal to 100 mm, less than or equal to 50 mm, less than or equal to 20 mm, less than or equal to 10 mm, less than or equal to 5 mm, less than or equal to 2 mm, or less than or equal to 1 mm. Combinations of the above-referenced ranges are also possible (e.g., greater than or equal to 0.5 mm and less than or equal to 10 m, or greater than or equal to 0.5 mm and less than or equal to 50 mm). In some embodiments, the length of the pathway may have a certain relationship to the 3D-printed article (e.g., if the 3D-printed article is an article of footwear, the length of the pathway may be the length of the article of footwear). Other ranges are also possible.

When a first portion and a second portion are connected by a pathway, a property (e.g., average pore size, density, stiffness, stiffness of solid components of the article, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, breathability) may change along the pathway at a rate that is advantageous. The average rate of change of the property may be greater than or equal to 0.05% of the average of the property in the first portion per mm, greater than or equal to 0.1% of the average of the property in the first portion per mm, greater than or equal to 0.2% of the average of the property in the first portion per mm, greater than or equal to 0.5% of the average of the property in the first portion per mm, greater than or equal to 1% of the average of the property in the first portion per mm, greater than or equal to 2% of the average of the property in the first portion per mm, greater than or equal to 20% of the average of the property in the first portion per mm, or greater than or equal to 100% of the average of the property in the first portion per mm. The average rate of change of the property may be less than or equal to 100% of the average of the property in the first portion per mm, less than or equal to 20% of the average of the property in the first portion per mm, less than or equal to 5% of the average of the property in the first portion per mm, less than or equal to 2% of the average of the property in the first portion per mm, less than or equal to 1% of the average of the property in the first portion per mm, less than or equal to 0.5% of the average of the property in the first portion per mm, less than or equal to 0.2% of the average of the property in the first portion per mm, or less than or equal to 0.1% of the average of the property in the first portion per mm. Combinations of the above-referenced ranges are also possible (e.g., greater than or equal to 0.05% and less than or equal to 5%, greater than or equal to 0.05% and less than or equal to 100%). Other ranges are also possible. It should be understood that the average rates of changed described above may apply to pathways that straight (e.g., pathways that are line segments), or to pathways that are curved.

In some embodiments, a first portion and a second portion as described herein may be components of a 3D-printed article that is a single integrated material. As used herein, two or more portions that together form a single integrated material are not separated by a separable interface. In some embodiments, a single integrated material may not separate into discrete parts during the course of normal use, and/or may be separated into discrete parts whose morphologies would not be predictable prior to normal use and/or along interfaces that would not be predictable prior to normal use. For instance, a single integrated material may lack seams and/or lack an adhesive that bonds two or more portions together. In some cases, the 3D-printed article as a whole may lack an interface at which one or more properties (e.g., average pore size, density, stiffness, stiffness of solid components of the article, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes as described above. In some cases, the property or properties may vary smoothly throughout the 3D-printed article.

In some embodiments, one or more portions may together form an 3D-printed article with one or more of the following features: macrovoids embedded within the article (e.g., a midsole) without an intersecting interface from overmolding, lamination, or ultrasonic welding; one or more open-celled lattices; one or more closed-celled lattices; variations in density across geometries that would be challenging to form by molding; interpenetrating foams and elastomers that may, in some embodiments, not be separated by an interface due to molding or lamination; and/or one or more interfaces between different materials with extreme undercuts (e.g., materials with a negative draft angle, materials which cannot be injection molded using a single mold because they would be unable to slide out of the mold).

Figure 30:
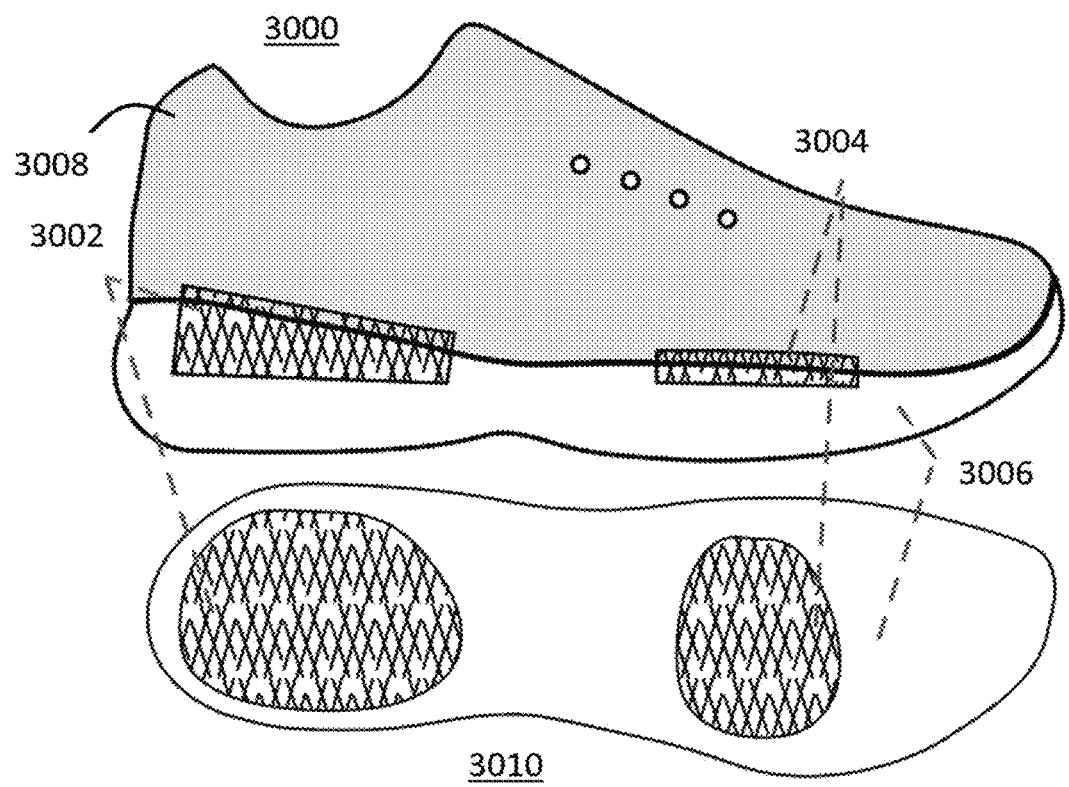
FIG. 30 is a schematic of an illustrative article of footwear comprising open-celled lattice inserts, in accordance with some embodiments.

In some embodiments, an article of footwear comprises a three-dimensionally printed feature (e.g., each of the open-celled lattice structures 3002 and 3004 of FIG. 30) comprising an open-celled lattice. In some embodiments, an article of footwear comprises a three-dimensionally printed feature comprising a closed-celled lattice. In some embodiments, the article of footwear comprises a closed cell foam (e.g., some embodiments of midsole 3006 of FIG. 30). In some embodiments, the three-dimensionally printed feature is at least partially embedded inside of the closed cell foam (e.g., the lower portions of open-celled lattice structures 3002 and 3004 are embedded in midsole 3006 of FIG. 30). In some embodiments, at least a portion of the open-celled lattice has an Asker C hardness less than Asker C 55. In some embodiments, at least a portion of the open-celled lattice has an Asker C hardness less than Asker C 50.

In some embodiments, at least a portion of the open-celled lattice has a lower hardness than other open-celled lattices in articles of footwear or apparel. In some embodiments, at least a portion of the open-celled lattice has an Asker C hardness less than or equal to Asker C 55, less than or equal to Asker C 50, less than or equal to Asker C 45, or less than or equal to Asker C 40. In some embodiments, at least a portion of the open-celled lattice has a Shore OO hardness of greater than or equal to OO 55, greater than or equal to OO 60, greater than or equal to OO 65, or greater than or equal to OO 70. Combinations of the above-referenced ranges are also possible (e.g., an Asker C hardness less than or equal to Asker C 55 and a Shore OO hardness of greater than or equal to OO 55, an Asker C hardness less than or equal to Asker C 50 and a Shore OO hardness of greater than or equal to OO 60). Other ranges are also possible. In some embodiments, at least a portion of the open-celled lattice has a Shore OO hardness of greater than OO 55 and an Asker C hardness less than Asker C 55.

In some embodiments, the three-dimensionally printed feature comprising a open-celled lattice comprises or consists of a polymeric material. For example, in some embodiment, the three-dimensionally printed feature comprising a open-celled lattice comprises or consists of a polymeric material selected from the group consisting of: thermoplastic polyurethane (TPU), a polyurethane thermosetting elastomer, a silicone, and a combination thereof.

In some embodiments, the open-celled lattice has an appropriate infill density, at least in part so as to contribute to the low hardness of at least a portion of the open-celled lattice. In some embodiments, the open-celled lattice has an infill density of greater than or equal to 10%, greater than or equal to 20%, greater than or equal to 30%, greater than or equal to 40%, or greater than or equal to 80%. In some embodiments, the open-celled lattice has an infill density of less than or equal to 80%, less than or equal to 75%, less than or equal to 65%, less than or equal to 55%, less than or equal to 45%, less than or equal to 35%, or less than or equal to 25%. Combinations of the above-referenced ranges are also possible (e.g., an infill density of greater than or equal to 10% and less than or equal to 80%, an infill density of greater than or equal to 20% and less than or equal to 80%). Other ranges are also possible.

In some embodiments, the open-celled lattice has appropriate infill rotations per layer, which may also be referred to as infill angles per layer, at least in part so as to contribute to the low hardness of at least a portion of the open-celled lattice. In some embodiments, the open-celled lattice has infill rotations per layer of greater than or equal to 10 degrees, greater than or equal to 20 degrees, greater than or equal to 30 degrees, greater than or equal to 40 degrees, or greater than or equal to 60 degrees. In some embodiments, the open-celled lattice has infill rotations per layer of less than or equal to 90 degrees, less than or equal to 80 degrees, less than or equal to 70 degrees, or less than or equal to 60 degrees. Combinations of the above-referenced ranges are also possible (e.g., infill rotations per layer of greater than or equal to 10 degrees and less than or equal to 90 degrees, infill rotations per layer of greater than or equal to 20 degrees and less than or equal to 80 degrees). Other ranges are also possible. For example, in some embodiments, a layer of the open-celled lattice has an infill rotation of from 0 degrees to 360 degrees, inclusive. In some embodiments, any layer of the open-celled lattice can be printed at any angle. As used herein, an angle, theta, that is from 0 degrees to 180 degrees, inclusive, also refers to an angle, delta, that is the sum of theta and 180 degrees. For example, 0 degrees also refers to 180 degrees, and 150 degrees also refers to 330 degrees. In some embodiments, the infill rotations per layer may follow a repeating pattern (e.g., 90 degrees, 30 degrees, 330 degrees, repeat). In some embodiments, the infill rotations per layer may not follow a repeating pattern.

In some embodiments, the open-celled lattice has an infill density in the range from 10% to 75%, inclusive, and/or has infill rotations per layer in the range from 10 degrees to 90 degrees, inclusive.

In some embodiments, at least a portion of the closed-celled lattice has a lower hardness than other closed-celled lattices in articles of footwear or apparel. In some embodiments, at least a portion of the closed-celled lattice has an Asker C hardness less than or equal to Asker C 55, less than or equal to Asker C 50, less than or equal to Asker C 45, or less than or equal to Asker C 40. In some embodiments, at least a portion of the closed-celled lattice has a Shore OO hardness of greater than or equal to OO 55, greater than or equal to OO 60, greater than or equal to OO 65, or greater than or equal to OO 70. Combinations of the above-referenced ranges are also possible (e.g., an Asker C hardness less than or equal to Asker C 55 and a Shore OO hardness of greater than or equal to OO 55, an Asker C hardness less than or equal to Asker C 50 and a Shore OO hardness of greater than or equal to OO 60). Other ranges are also possible. In some embodiments, at least a portion of the closed-celled lattice has a Shore OO hardness of greater than OO 55 and an Asker C hardness less than Asker C 55.

In some embodiments, the three-dimensionally printed feature comprising a closed-celled lattice comprises or consists of a polymeric material. For example, in some embodiment, the three-dimensionally printed feature comprising a closed-celled lattice comprises or consists of a polymeric material selected from the group consisting of: thermoplastic polyurethane (TPU), a polyurethane thermosetting elastomer, a silicone, and a combination thereof.

In some embodiments, the closed-celled lattice has an appropriate infill density, at least in part so as to contribute to the low hardness of at least a portion of the closed-celled lattice. In some embodiments, the closed-celled lattice has an infill density of greater than or equal to 10%, greater than or equal to 20%, greater than or equal to 30%, greater than or equal to 40%, or greater than or equal to 80%. In some embodiments, the closed-celled lattice has an infill density of less than or equal to 80%, less than or equal to 75%, less than or equal to 65%, less than or equal to 55%, less than or equal to 45%, less than or equal to 35%, or less than or equal to 25%. Combinations of the above-referenced ranges are also possible (e.g., an infill density of greater than or equal to 10% and less than or equal to 80%, an infill density of greater than or equal to 20% and less than or equal to 80%). Other ranges are also possible.

In some embodiments, the closed-celled lattice has appropriate infill rotations per layer, which may also be referred to as infill angles per layer, at least in part so as to contribute to the low hardness of at least a portion of the closed-celled lattice. In some embodiments, the closed-celled lattice has infill rotations per layer of greater than or equal to 10 degrees, greater than or equal to 20 degrees, greater than or equal to 30 degrees, greater than or equal to 40 degrees, or greater than or equal to 60 degrees. In some embodiments, the closed-celled lattice has infill rotations per layer of less than or equal to 90 degrees, less than or equal to 80 degrees, less than or equal to 70 degrees, or less than or equal to 60 degrees. Combinations of the above-referenced ranges are also possible (e.g., infill rotations per layer of greater than or equal to 10 degrees and less than or equal to 90 degrees, infill rotations per layer of greater than or equal to 20 degrees and less than or equal to 80 degrees). Other ranges are also possible. For example, in some embodiments, a layer of the closed-celled lattice has an infill rotation of from 0 degrees to 360 degrees, inclusive. In some embodiments, any layer of the closed-celled lattice can be printed at any angle. As used herein, an angle, theta, that is from 0 degrees to 180 degrees, inclusive, also refers to an angle, delta, that is the sum of theta and 180 degrees. For example, 0 degrees also refers to 180 degrees, and 150 degrees also refers to 330 degrees. In some embodiments, the infill rotations per layer may follow a repeating pattern (e.g., 90 degrees, 30 degrees, 330 degrees, repeat). In some embodiments, the infill rotations per layer may not follow a repeating pattern.

In some embodiments, the closed-celled lattice has an infill density in the range from 10% to 75%, inclusive, and/or has infill rotations per layer in the range from 10 degrees to 90 degrees, inclusive.

In some embodiments, the closed cell foam (e.g., some embodiments of midsole 3006 of FIG. 30) is not three-dimensionally printed.

In some embodiments, the three-dimensionally printed feature comprises a first portion and a second portion, wherein there is at least a 10% difference in compression force deflection between the first portion and the second portion.

In some embodiments, the three-dimensionally printed feature is an insert into the closed cell foam and the closed cell foam is a portion of the article of footwear selected from the group consisting of: midsole, outsole, insole, sockliner, and footbed.

In some embodiments, the three-dimensionally printed feature comprises a thermoplastic material, and the thermoplastic material has substantially the same composition as the material which the majority of the weight of the remainder of the shoe comprises. In some embodiments, the three-dimensionally printed feature comprises a thermoplastic material, and the thermoplastic material has substantially the same composition as the material of which the majority of the weight of the remainder of the shoe consists. In some embodiments, the three-dimensionally printed feature comprises a thermoplastic polyurethane, a polyurea, or a combination of the two, and wherein the three-dimensionally printed feature composition comprises at least 15% by weight of raw materials that are derived from organisms of the plant kingdom.

As will be known to those of ordinary skill in the art, a foam is a structure having both solid and vapor portion(s). A closed cell foam comprises individual vapor-containing cavities, including at least a first vapor-containing cavity and a second vapor-containing cavity, that are not connected to one another. An open-celled foam comprises vapor-containing cavities, including at least a first vapor-containing cavity and a second vapor-containing cavity, that are connected to one another.

In some embodiments, a structure may be a "lattice", e.g. an "open-celled lattice" or a "closed-celled lattice," each of which may refer to a regular repeated three-dimensional arrangement of cavities in a solid matrix, at a larger scale but analogous to the arrangement of atoms, ions or molecules in a crystalline solid. An open-celled lattice comprises cavities, in a regular repeated three-dimensional arrangement, that are connected to one another. An open-celled lattice also comprises solid regions, in a regular repeated three-dimensional arrangement, that are connected to one another. A closed-celled lattice comprises cavities, in a regular repeated three-dimensional arrangement, that are not connected to one another. A closed-celled lattice also comprises solid regions, in a regular repeated three-dimensional arrangement, that are connected to one another. An open-celled lattice may be created in a similar way to a log stack, but on a smaller scale, to create cavities that are interconnected, and solid regions that are also interconnected. A three-dimensionally printed object may have one or more portions that comprise an open-celled lattice, one or more portions that are solid, and/or one or more portions that comprise a closed-celled lattice. In some cases, an open-celled lattice could comprise or consist of an elastomer, e.g., an elastomer in the form of a closed-celled foam.

FIG. 30 is a schematic of a side view 3000 and a top view 3010 of an illustrative article of footwear comprising open-celled lattice inserts, in accordance with some embodiments. The article of footwear of FIG. 30 comprises an open-celled lattice structure 3002 partially embedded in the heel of a midsole 3006, and an open-celled lattice structure 3004 partially embedded in the forefoot of midsole 3006, wherein each of open-celled lattice structure 3002 and open-celled lattice structure 3004 comprises an open-celled lattice. In some embodiments, at least a portion of the open-celled lattice has an Asker C hardness less than Asker C 55. In some embodiments, at least a portion of the open-celled lattice has an Asker C hardness less than Asker C 50. In some embodiments, at least one of, or each of, the open-celled lattice structures 3002 and 3004 is/are a three-dimensionally printed feature. In some embodiments, midsole 3006 is non-three-dimensionally printed. In some embodiments, midsole 3006 comprises a closed cell foam. It should be understood that in other embodiments, only a single open-celled lattice structure, or additional open-celled lattice structures, comprising an open-celled lattice may be present and at least partially embedded in midsole 3006. It should also be understood that in some embodiments, one or more closed-celled lattice structures may be present, in addition to or instead of one or more open-celled lattice structures, and at least partially embedded in midsole 3006. It should also be understood that other shapes and relative sizes of open-celled lattice structures 3002 and 3004, midsole 3006 and upper 3008, are also possible.

It should also be understood that certain 3D-printed articles described herein may not be foams (i.e., they may not include any pores). For instance, certain embodiments may relate to 3D-printed articles that are not foams and that comprise one or more elastomers. In addition, in some cases, an article may be printed that can then be formed into a foam, e.g., using a chemical reaction to produce a gas within the article.

Figure 1C:
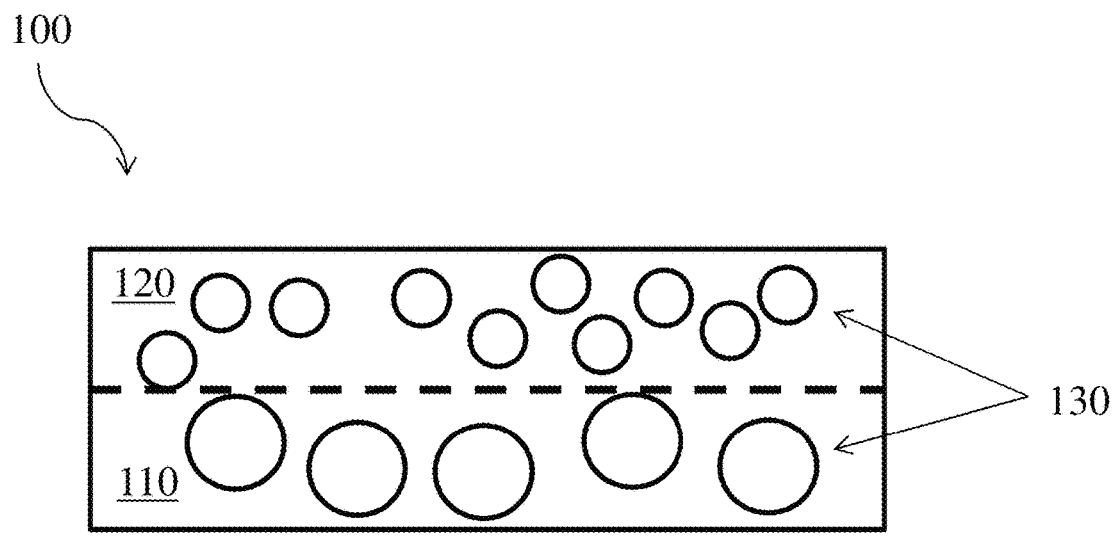

As shown in FIG. 1C, in some but not necessarily all embodiments, a 3D-printed article that is a foam (e.g., a closed-cell foam that is optionally a single integrated material) may comprise one or more portions having different properties. FIG. 1C shows 3D-printed article 100 comprising first portion 110, second portion 120, and pores 130. Although FIG. 1C depicts a 3D-printed article comprising an average pore (or cell) size in the first portion (i.e. a first average pore size) that is different from an average pore (or cell) size in the second portion (i.e., a second average pore size), in some embodiments the first portion and the second portion may have the same average pore size but may comprise differences in other properties (e.g., one or more of the density, stiffness, Shore A hardness, microindentation hardness, nanoindentation hardness, degree of cross-linking, chemical composition may be different in the first portion than in the second portion). Thus the pore sizes are presented here for illustrative portions only. Similarly, although FIG. 1C shows an average pore size in the first portion that is larger than the average pore size in the second portion, in some embodiments the average pore size of the first portion may be smaller than the average pore size of the second portion.

Figure 2:
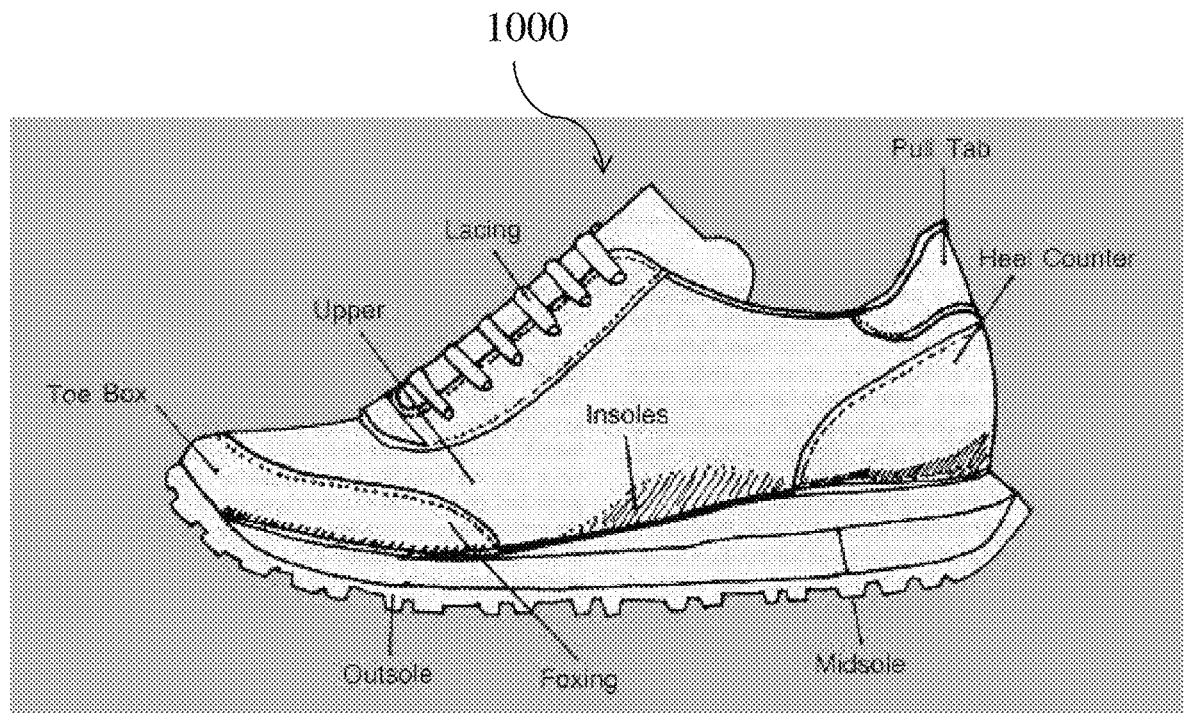
FIG. 2 illustrates an article of footwear according to certain embodiments of the invention.

In some embodiments, a 3D-printed article as designed herein may be suitable for use as a component of one or more articles of footwear. FIG. 2 shows one non-limiting embodiment of an article of footwear 100. The article of footwear comprises a sole, a toe box, an upper; lacing, a heel counter, and a pull tab. It should be understood that 3D-printed articles suitable for use in footwear may form any of the components or be a portion of any or all of the components shown in FIG. 2. In some embodiments, multiple 3D-printed articles may be positioned on a single article of footwear (e.g., a single article of footwear may comprise a 3D-printed article that is disposed on a sole or is a sole and a 3D-printed article that is disposed on an upper). In some embodiments, the 3D-printed article may be a sole or a sole component, such as an outsole, a midsole, or an insole. In some embodiments, the 3D-printed article may be an article that is printed onto a sole component, such as a midsole and/or insole that is printed onto an outsole (e.g., a commercially available outsole, an outsole produced by a non-3D printing process). In some embodiments, the 3D-printed article may be printed as a separate article comprising one or more portions, and then may be subsequently assembled onto or into another portion of the article of footwear. In some embodiments, the 3D-printed article may be assembled into a non-3D-printed portion of the article of footwear. In some embodiments the 3D-printed article may comprise a gradient in one or more properties. In some embodiments, the 3D-printed article may comprise or be a foam or an open-celled lattice or a closed-cell lattice. In some embodiments, the 3D-printed article may be post processed after printing (e.g., die-cut, computer numerical control (CNC) cut, thermally formed, other process(es)). The post processing may happen before or after integration with the article of footwear. As a non-limiting example, a 3D-printed article may comprise an open-celled lattice with multiple layers and/or a closed-celled lattice with multiple layers. The open-celled lattice and/or the closed-celled lattice may have a gradient in one or more properties (e.g., stiffness, color, Shore A hardness, microindentation hardness, nanoindentation hardness, compressive force deflection, lattice density). After fabrication, the open-celled lattice or closed-celled lattice may be cured, die cut, and then inserted into or onto a non-3D-printed portion of a shoe (e.g., a midsole, a sockliner, an insole, an outsole). In some embodiments, the 3D-printed article may be inserted into multiple regions of an article of footwear (e.g., an insert into a cavity in the heel and forefoot of a midsole, an insert into a sockliner or insole). In some embodiments, the non-3D-printed portion may be prefabricated with a cavity configured to receive the 3D-printed portion. In some embodiments, the 3D-printed article may be an upper. In some embodiments, the 3D-printed article may be an article that is printed onto an upper, such as a toe box, a heel counter, an ankle support, an eyestay, an article comprising a logo and/or embodying a logo, an eyelet, a quarter panel, a no sew overlay feature, and/or a pull tab. The upper may be one component of a fully assembled shoe which lacks the part(s) to be printed, or it may be an upper that has not been assembled with other footwear components. In some embodiments, a 3D-printed article may be a combination of two or more footwear components that are typically provided as separate articles. For example, the 3D-printed article may be able to serve as both a midsole and an insole, or may comprise a midsole and an insole that are a single integrated material. As another example, the 3D-printed article may be able to serve as both an outsole and an insole, or may comprise an outsole and an insole that are a single integrated material. In some embodiments, a 3D-printed article comprising two or more footwear components (e.g., a 3D-printed article comprising a midsole and an insole, a 3D-printed article comprising an outsole and an insole) may be printed using a single integrated process. Although FIG. 2 shows an athletic shoe, 3D-printed articles suitable for use in other types of footwear are also contemplated as described in further detail below. In some embodiments, the 3D-printed article may also or instead be suitable for one or more non-footwear components, such as orthotics and/or prosthetics.

Figure 3A:
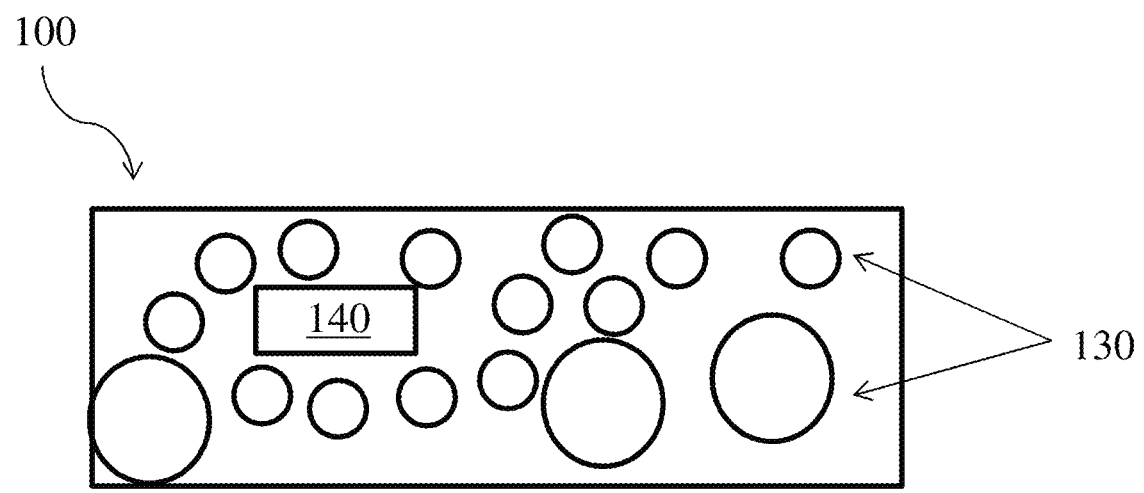
FIG. 3A illustrates a 3D-printed article comprising a sensor according to certain embodiments of the invention.
Figure 3B:
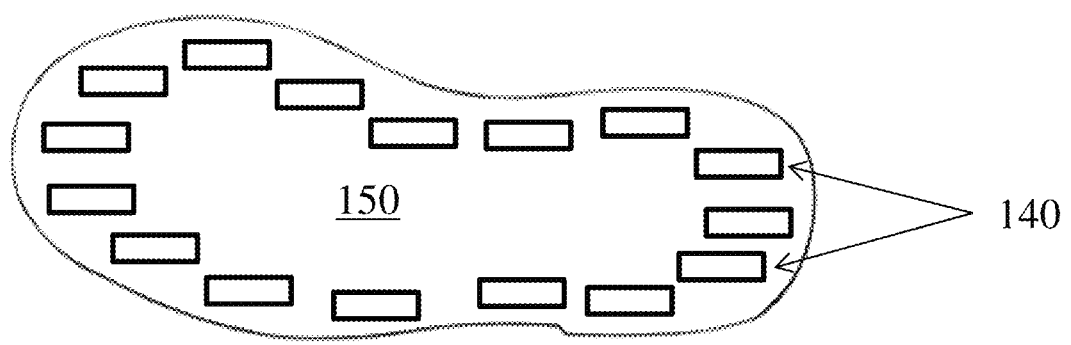
FIG. 3B illustrates a 3D-printed article comprising a plurality of sensors according to certain embodiments of the invention.
Figure 4:
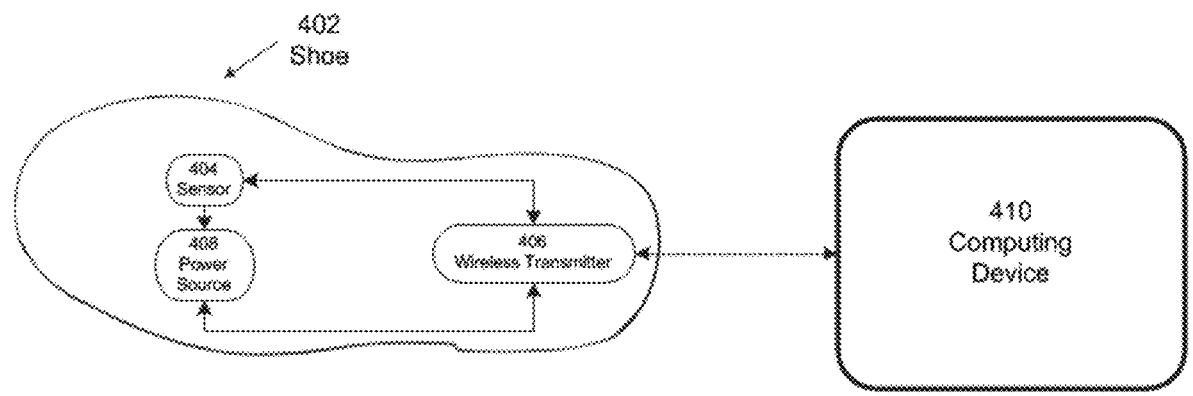
FIG. 4 illustrates a 3D-printed article in communication with a computing device according to certain embodiments of the invention.
Figure 5:
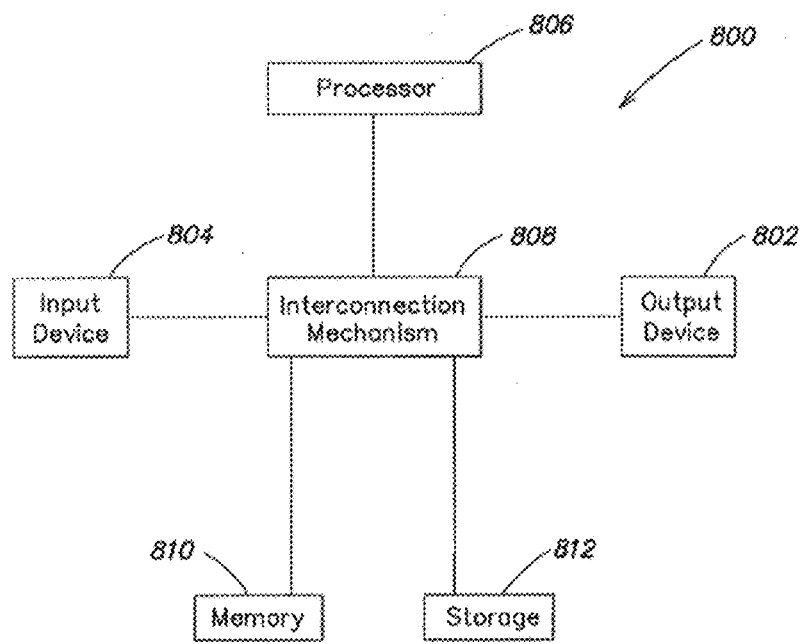
FIG. 5 illustrates an implementation of a computing device according to certain embodiments of the invention.
Figure 6:
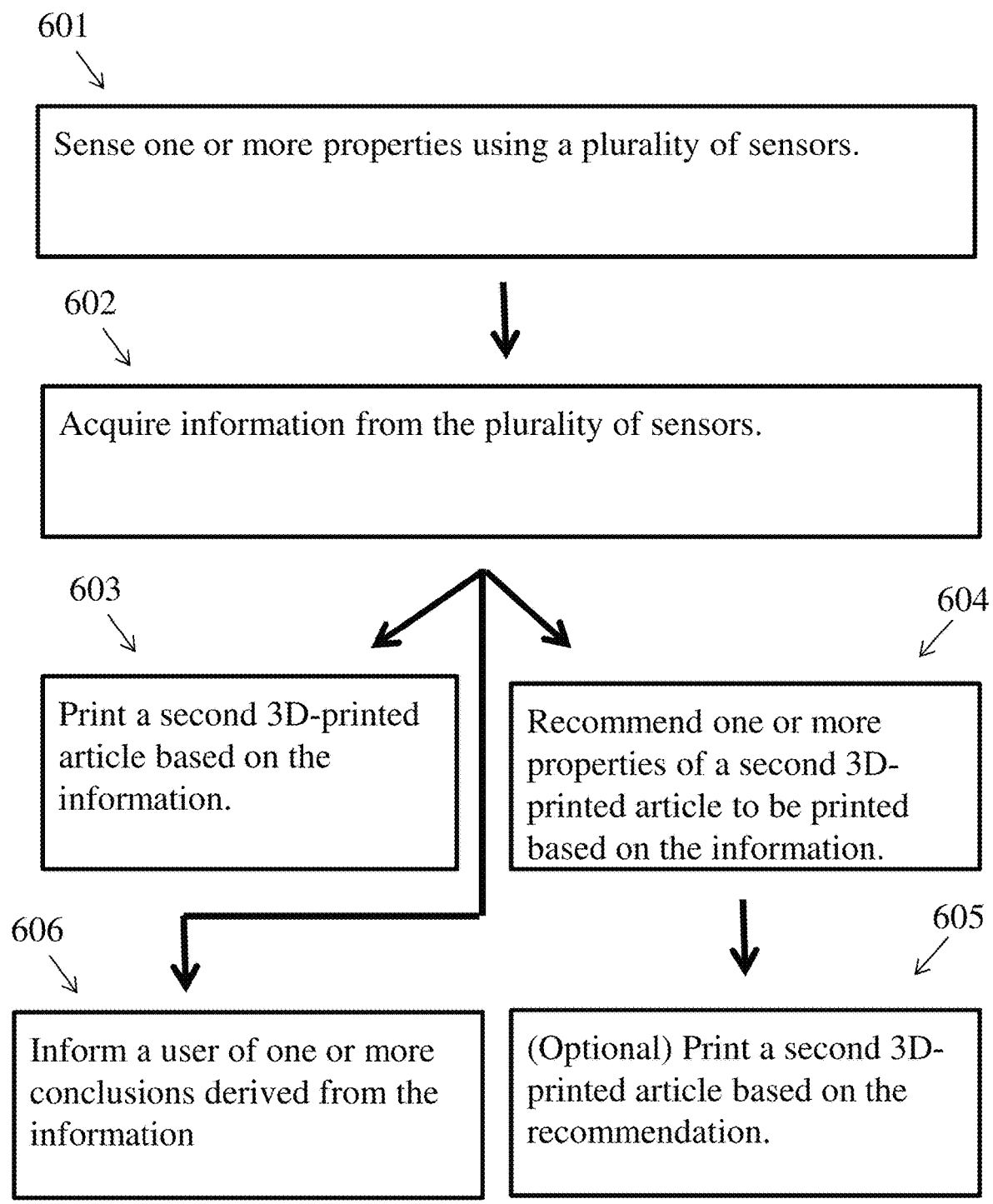
FIG. 6 is a flow chart illustrating a method according to certain embodiments of the invention.
Figure 7A:
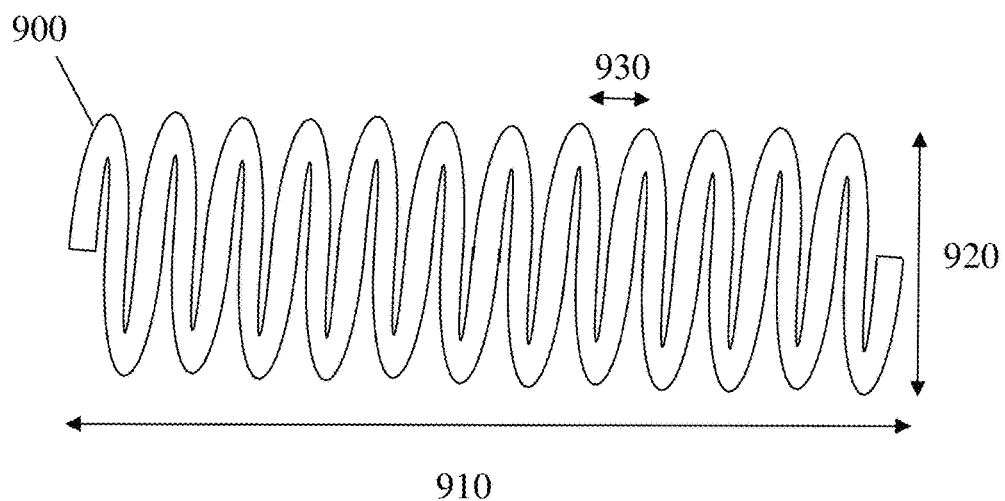
FIGS. 7A and 7B are schematic illustrations of meanders, according to some embodiments of the invention.
Figure 7B:
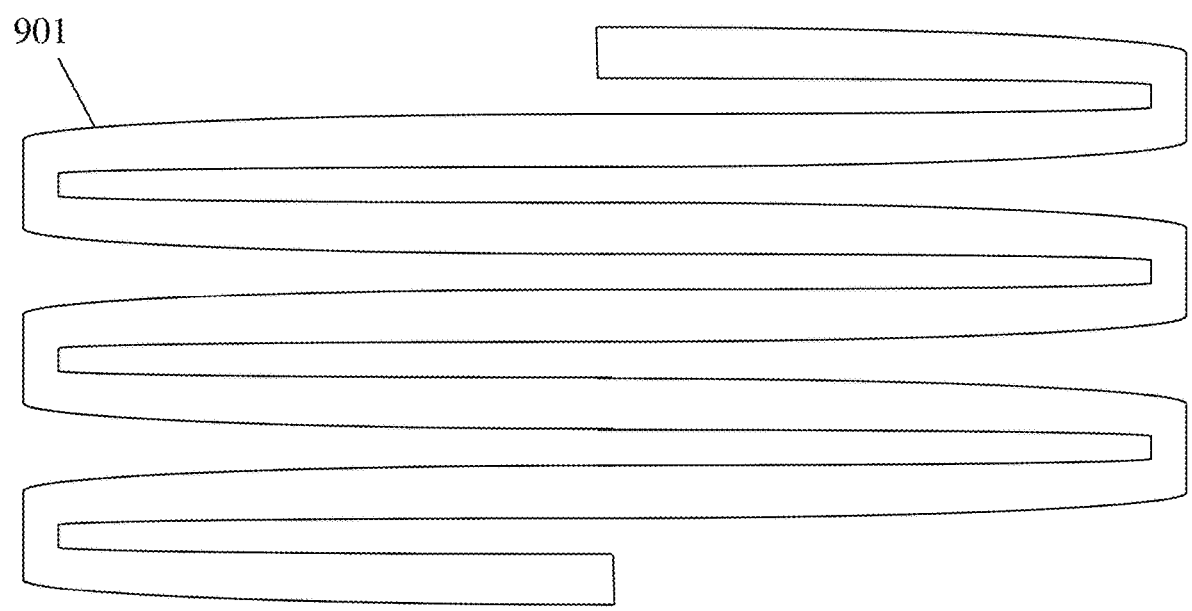

In some embodiments, a 3D-printed article (e.g., a foam that optionally is a closed-cell foam, is a single integrated material, and/or comprises two or more portions; an article that is not a foam; an article that comprises an elastomer, etc.) may comprise one sensor or may comprise a plurality of sensors. FIG. 3A shows one non-limiting embodiment where 3D-printed article 100 further comprises sensor 140. As described above, the sensor may be capable of sensing one or more properties of an article of footwear of which it is a component and/or of a user of an article of footwear of which it is a component. When present, the plurality of sensors may comprise sensors that are each identical to each other (e.g., the plurality of sensors may comprise identical sensors dispersed throughout the 3D-printed article) and/or may comprise different and/or complementary sensors (e.g., the plurality of sensors may comprise sensors that are capable of measuring different properties).

As described above, certain articles as described herein may be formed by a process involving one or more 3D-printing steps. In some embodiments, an article may be formed by a process involving both one or more 3D-printing steps and one or more non-3D-printing steps. For example, an article may be formed by a first 3D-printing step followed by a first non-3D-printing step which is optionally followed by one or more further 3D-printing steps or non-3D-printing steps. For example, a sole or sole component may be 3D-printed into a mold to form a first portion and then a material may be injection molded or compression molded above the first portion to form the second portion. Third, fourth, fifth, and/or higher numbered portions may then optionally be formed on the second portion (by, e.g., 3D-printing). As another example, a non-3D printing step may comprise directly bonding two materials by pressing a first material (e.g., a non-3D-printed material, an upper) into a second 3D-printed material (e.g., a 3D-printed midsole) prior to full curing of the second material. As a third example, an inkjet finishing process may be applied to deposit one or more materials (e.g., one more pigments) on a 3D-printed article or on a material disposed on a 3D-printed article (e.g., a material injection molded or compression molded on a 3D-printed article). In some embodiments, an inkjet finishing process may enhance the surface quality of the article that is subject to it.

A variety of suitable inkjet processes may be combined with 3D-printing processes described herein. In some embodiments, an inkjet process may be employed to deposit one or more layers of material onto a 3D-printed article. For instance, two or more layers may be deposited consecutively to increase the thickness of a surface finishing layer and/or to form a 3D structure on the surface of the 3D-printed article. The layer(s), or other structure(s) formed by an inkjet process, may comprise one or more translucent portions (e.g., may be translucent) and/or may comprise one or more non-translucent portions (e.g., may be non-translucent). The layer(s) or other structure(s) may cover one or more portions of the 3D-printed article (e.g., may cover one or more portions of the 3D-printed article and not cover one or more portions of the 3D-printed article) or may cover the entirety of the 3D-printed article. The layer(s) or structure(s) may have a variety of surface properties. In certain embodiments, the layer(s) or other structure(s) may increase the surface roughness of the article, cause the article to have a matte finish, and/or reduce the reflectivity of the article (e.g., reduce the reflectivity of its surface).

As will be described in further detail below, in 3D-printed articles may be formed by depositing a material from a nozzle onto a substrate. The nozzle may be translated with respect to the substrate (and/or the substrate translated with respect to the nozzle) during this process. In certain cases, the nozzle and/or substrate may be translated such that the deposited material meanders (i.e., forms a meander on the substrate).

Figure 8A:
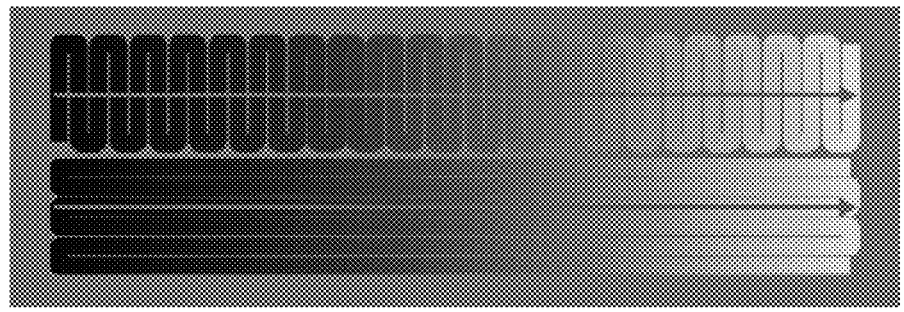
FIG. 8A is a schematic illustration of meanders parallel and perpendicular to gradients, according to some embodiments of the invention.
Figure 8B:
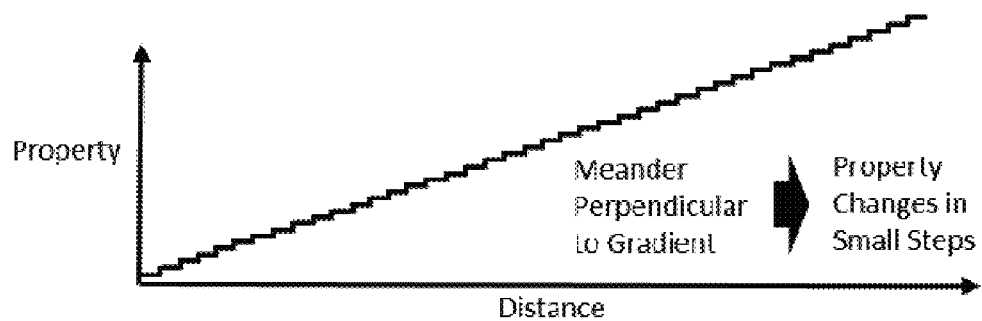
FIG. 8B is a plot showing a stepped gradient, according to some embodiments of the invention.
Figure 8C:
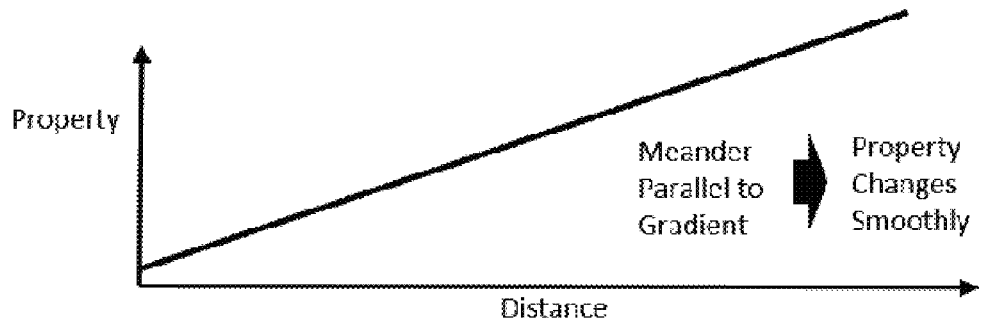
FIG. 8C is a plot showing a smooth gradient, according to some embodiments of the invention.

In some cases, one or more properties of the material being deposited by the nozzle may change as a function of time and/or position, which may result in changes in one or more properties of the 3D-printed article as a function of printing time and/or position. As one example, a gradient in a property (e.g., average pore size, density, stiffness, stiffness of solid components of the article, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, breathability, etc.) may be generated by varying one or more properties of the material being deposited by the nozzle. In some cases, a material may be deposited on a substrate in a meander (which may be regular or irregular) and a gradient may be formed along the meander or perpendicular to the meander. FIG. 8A shows a non-limiting schematic depiction of a gradient that is parallel to a meander and a non-limiting schematic depiction of a gradient that is perpendicular to a meander. FIG. 8B shows a non-limiting example of the change in the value of a property as a function of distance along the gradient when the gradient is formed perpendicular to the meander. Gradients of this type are stepped gradients, or gradients encompassing step changes. FIG. 8C shows a non-limiting example of the change in the value of a property as a function of distance along the gradient when the gradient is formed parallel to the meander. Gradients of this type are smooth gradients, or gradients that lack step changes. The rate of change of the gradient, in a smooth gradient, may be constant (i.e., a linear gradient), or the rate of change may result in a non-linear smooth gradient. It should be understood that both smooth and stepped gradients are encompassed by the use of the term gradient, and that gradients referenced herein, if not otherwise specified, should be understood to include smooth gradients in some embodiments and stepped gradients in other embodiments. In addition, some gradients may comprise one or more smooth portions and one or more stepped portions.

In certain embodiments, an article (e.g., a portion, an article of footwear, a component of an article of footwear) as described herein may be produced on a multi-axis deposition system, and/or a method as described herein may include at least one step (e.g., a 3D-printing step, a non 3D-printing step) that is performed on a multi-axis deposition system. It should be understood that articles of apparel (e.g., an article of apparel such as a sports bra, a component of an article of apparel such as a sports bra) may also be produced on a multi-axis deposition system as described herein. In general, and as described further below, multi-axis deposition systems include a print head and a substrate. The print head may be any suitable print head configured to deposit a material onto the substrate. The substrate may be any suitable substrate onto which a material may be deposited; in some embodiments, one or more articles (e.g., a component of an article of footwear, an upper, a sock liner) may be disposed on the substrate. In certain embodiments, one or both of the print head and substrate may be translated along one or more axes and/or rotated around one or more axes. Translation and/or rotation of the print head and/or substrate may enable the position of the print head with respect to the substrate to be changed prior to, during, and/or after a printing process. In some cases, translation and/or rotation of the print head and/or the substrate may allow the print head to deposit material onto a wide variety of substrate surfaces and/or allow the print head to deposit material onto the substrate at a wide variety of angles. In some embodiments, the print head may be configured to be rotated and/or translated such that it can deposit material onto each surface of the substrate.

Figure 9:
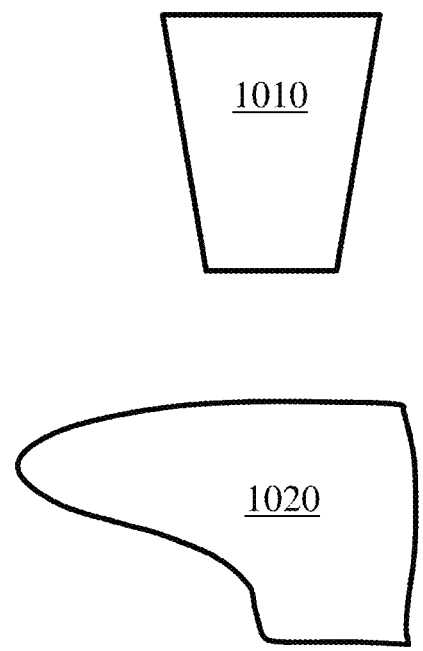
FIG. 9 is a schematic depiction of a print head and a substrate, according to certain embodiments of the invention.
Figure 10:
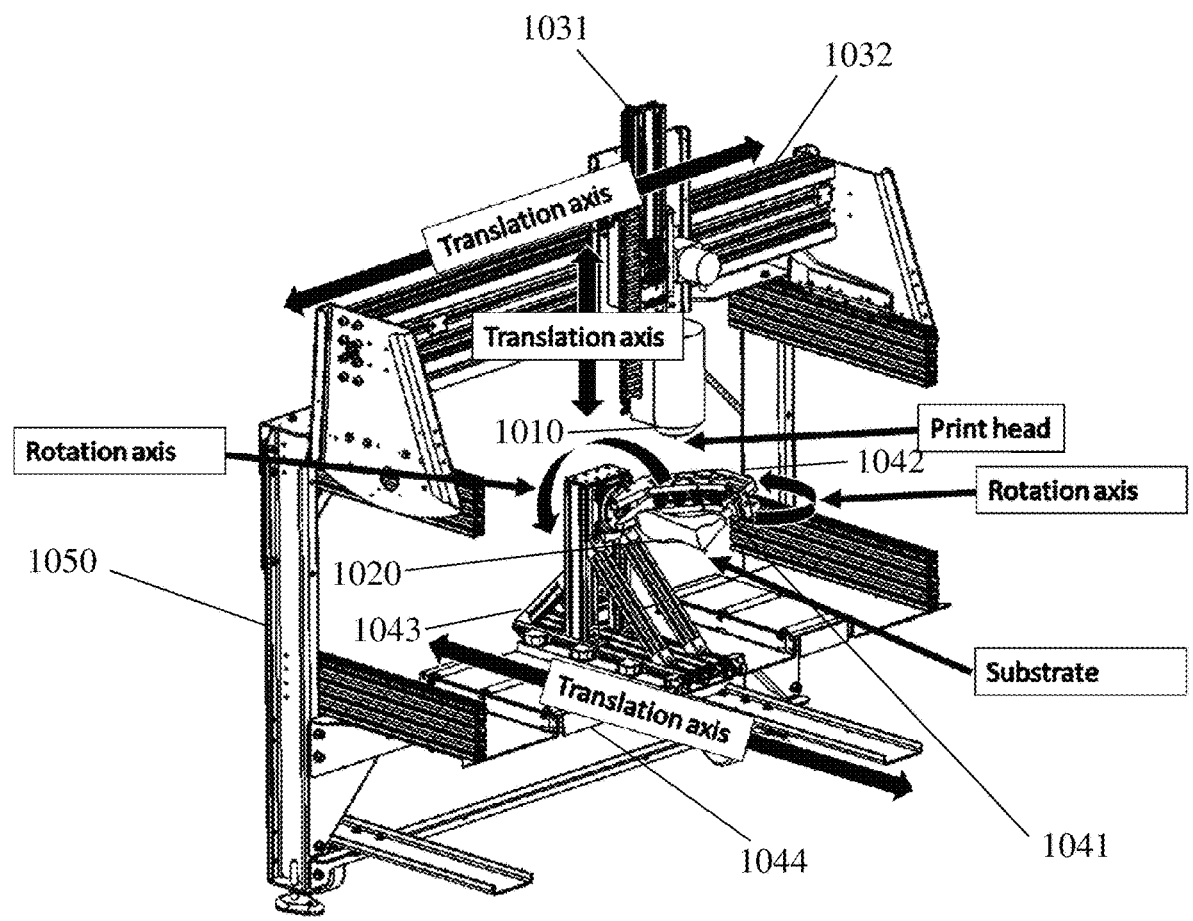
FIGS. 10-12 are schematic depictions of a multi-axis deposition system, according to certain embodiments of the invention.
Figure 11:
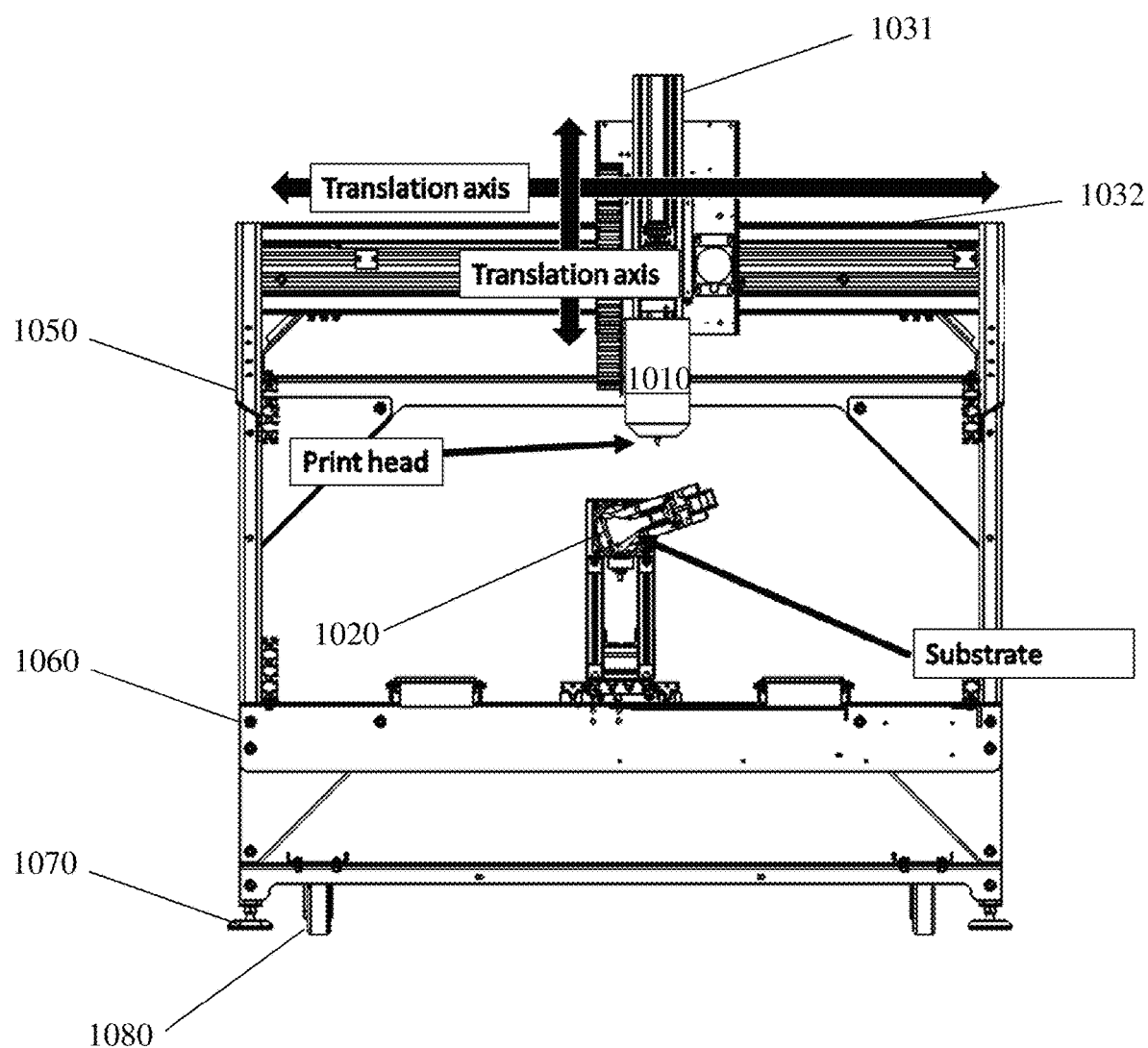
Figure 12:
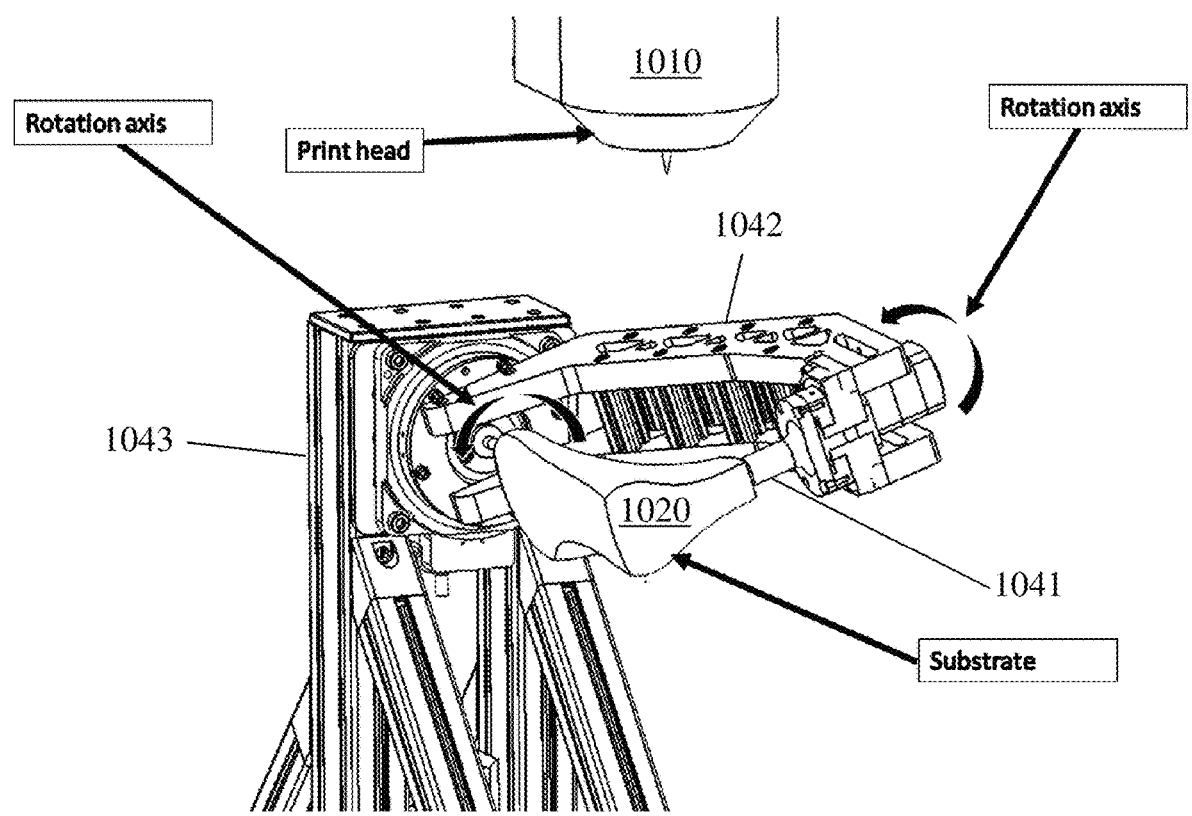
Figure 13:
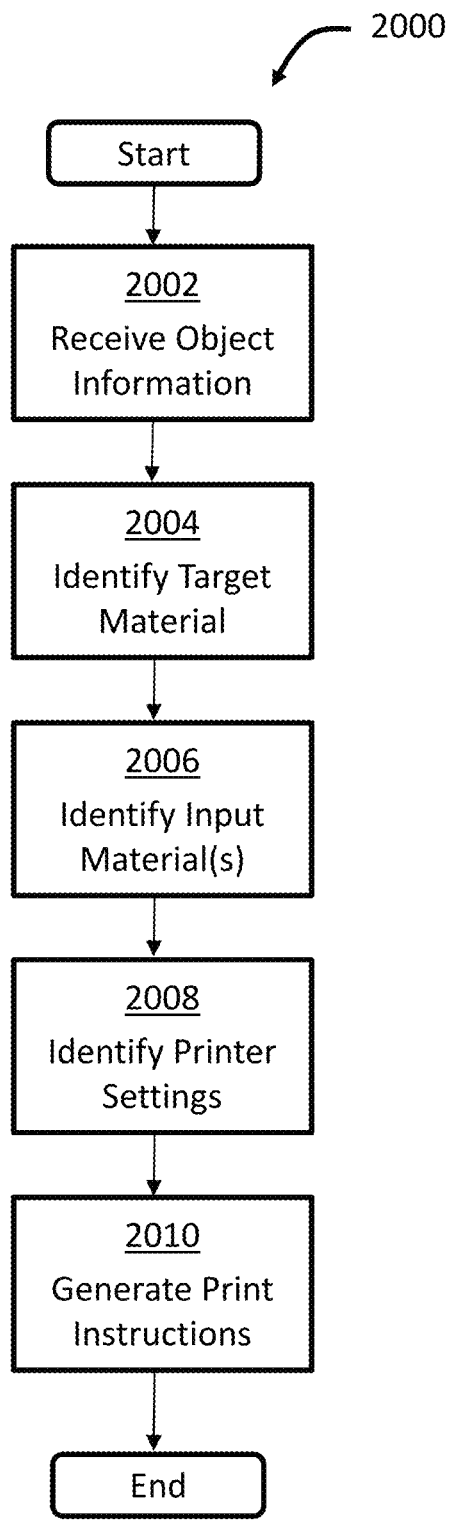
FIG. 13 illustrates an implementation of a computer program according to certain embodiments of the invention.

FIG. 9 shows one non-limiting embodiment of a multi-axis deposition system 1000 comprising print head 1010 and substrate 1020. The print head, substrate, and multi-axis deposition system will be described in further detail below.

Figure 22A:
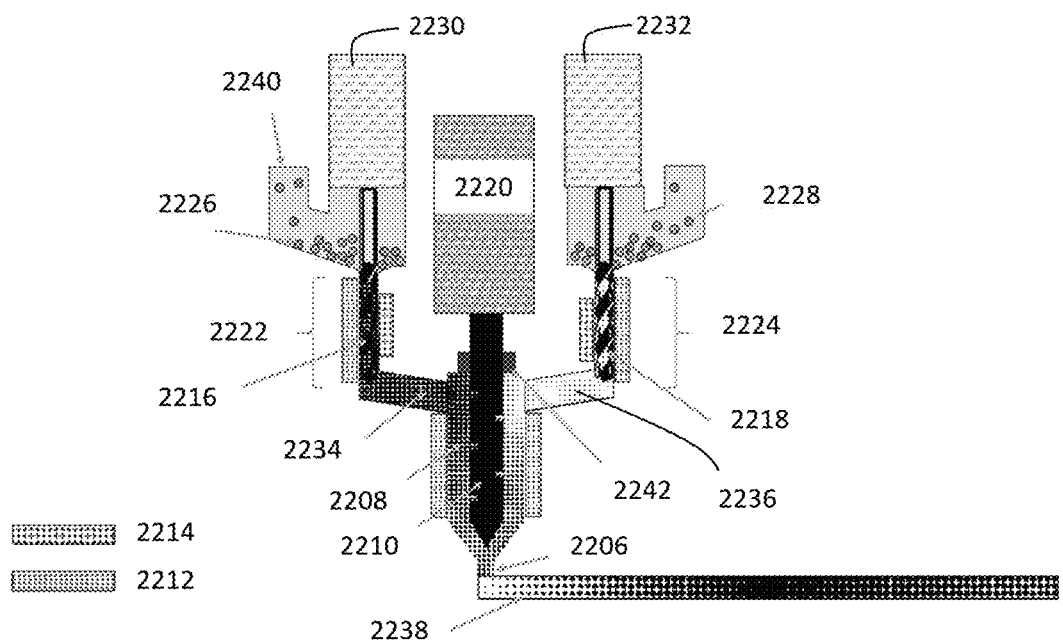
FIG. 22A is a schematic of an illustrative extrusion print head having two polymeric (e.g., thermoplastic) material (e.g., pellet) inputs and configured for printing graded (e.g., mechanically graded) polymeric parts (e.g., thermoplastic parts), in accordance with some embodiments.
Figure 22B:
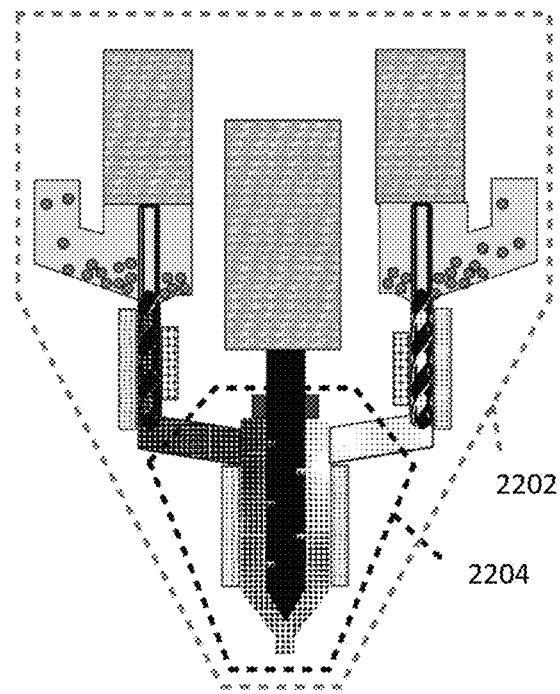
FIG. 22B is a schematic demonstrating the distinction between the entire print head of FIG. 22A and a portion of the print head that is a microfluidic printing nozzle, in accordance with some embodiments.

A print head in a multi-axis deposition system may be any suitable print head configured to deposit a material of interest onto the substrate. In some embodiments a multi-axis deposition system may comprise two or more print heads. Non-limiting examples of suitable print heads include a direct write head, a mixing nozzle as described further below, an ink jet head, a spray valve, an aerosol jet print head, a laser cutting head, a hot air gun, a hot knife, an ultrasonic knife, a sanding head, a polishing head, a UV curing device, an engraver, an embosser, and the like. In some embodiments, it may be advantageous for the multi-axis deposition system to comprise a first print head that comprises a mixing nozzle and a second print head that does not comprise a mixing nozzle. As also described below, in some embodiments, the print head may be configured to accept one or more material inputs (e.g., one material input, two material inputs, etc.). When two or more material inputs are present, the inputs may be substantially the same or they may differ. In some embodiments, the print head may be configured to mix two or more reactive material inputs to form a reactive mixture that may be deposited onto a substrate while the first and second material inputs are reacting and/or after the first and second material inputs have reacted. For example, the print head may be configured to mix a polyol and an isocyanate to form a reactive polyurethane mixture. Other examples of suitable reactive mixtures include reactive polyurea mixtures, reactive mixtures comprising reactive polyurethane and reactive polyurea blends (e.g., polyurethane/polyurea hybrid formulations), reactive mixtures comprising epoxy groups and amine groups, and reactive silicone mixtures. In some embodiments, the material inputs may not react with one another. In some embodiments, the material inputs may both be thermoplastics with a substantially similar composition, but with different material properties. For example, the material inputs may all be thermoplastics (e.g., thermoplastic polyurethanes (TPUs)). As a non-limiting example, one input may be a thermoplastic polyurethane with a Shore A hardness below 70 A, and another input may be a thermoplastic polyurethane with a Shore D hardness greater than 55 D. These two materials may be melted prior to flowing through an input to a mixing chamber, and then be pumped into the mixing chamber, mixed, and deposited onto a substrate through a nozzle. By controlling the ratios of the two or more inputs, the material properties of the 3D-printed article may be changed throughout the print. FIG. 22A-FIG. 22B show a non-limiting diagram of a two-input print head configured for heating, dosing, mixing, and deposition of two polymeric materials (e.g., thermoplastics) having different material properties. Other combinations are also possible (e.g., thermoplastic inputs with different colors, different coefficients of friction, different melting points). In other embodiments, the thermoplastics may be other types of thermoplastics. Suitable examples include, but are not limited to: thermoplastic polyurethanes (TPU), thermoplastic elastomers (TPE), thermoplastic polyolefins, thermoplastic polyesters, polyester terephthalates, polyamides, nylons, acrylonitrile-butadiene-styrene copolymers, polyethylenes, polyether polyamide co-polymers, polybutylene-terephthalate polyether copolymers, and polybutylene-terephthalate polyester copolymers. In some embodiments, the material inputs may comprise or consist of recycled polymers. In some embodiments, the material inputs may comprise or consist of raw materials that comprise or consist of raw materials derived from plants, animals, and/or waste materials. In some embodiments, the composition of the raw material feedstocks may be chosen such that the 3D-printed articles may be recycled in the same recycling stream as other components of the article of footwear. As a non-limiting example, the material inputs for 3D printing may comprise or be thermoplastic polyurethanes, and may be printed onto, or assembled onto/into a component of an article of footwear that is substantially composed of (e.g., having at least 50 volume %, 50 weight % and/or 50 mass % of) a material of substantially similar composition. For example, a 3D-printed component of a shoe upper, and a textile that is also a component of the shoe upper, may both comprise or consist of thermoplastic polyurethane. In some embodiments, the 3D-printed article, the upper textile, and the bottom of the shoe (e.g., midsole, outsole, insole, or a combination thereof) may all comprise or consist of substantially the same thermoplastic.

As used herein, the terms "substantially the same" or "substantially similar" or "similar" regarding e.g. a first and second polymeric composition, material or article, may refer to: the first polymeric composition, material or article having at least 50 weight % of the same polymer units as in the second polymeric composition, material or article; and/or the first polymeric composition, material or article being compatible with the second polymeric composition, material or article.

As used herein, the term "compatible" will be understood by those of ordinary skill in the art and may refer to a blend of a first polymeric composition, material or article in solid form and a second polymeric composition, material or article in solid form having less than or equal to the number of glass transition temperatures of the unblended virgin polymer—of either the first polymeric composition, material or article or the second polymeric composition, material or article—with the largest number of glass transition temperatures, as measured by differential scanning calorimetry, or dynamic mechanical analysis, using methods known to one of ordinary skill in the art. In some embodiments, the blend may shift at least one (e.g., each) of the glass transition temperatures; in some such embodiments, it is the number of glass transition temperatures (rather than the glass transition temperature(s) themselves) that is relevant to the evaluation of compatibility.

As a first example of compatibility or incompatibility, a first polymer has two separate glass transition temperatures, and a second polymer also has two separate glass transition temperatures. In this first example, if the first polymer and the second polymer are compatible, then the blend of the two polymers will have two or fewer distinct glass transition temperatures. In this first example, if the first polymer and the second polymer are incompatible, then the blend of the two polymers will have greater than two (e.g., three or more) glass transition temperatures.

As a second example of compatibility or incompatibility, a first polymer has a single glass transition temperature, and a second polymer has two separate glass transition temperatures. In this second example, if the first polymer and the second polymer are compatible, then the blend of the two polymers will have two or fewer (e.g., one) distinct glass transition temperatures. In this second example, if the first polymer and the second polymer are incompatible, then the blend of the two polymers will have greater than two (e.g., three or more) glass transition temperatures.

FIG. 22A is a schematic diagram of a non-limiting illustrative print head, in accordance with some embodiments. The print head of FIG. 22A is a multi-input print head for three-dimensionally printing. The print head 2202 of FIG. 22A is delineated in FIG. 22B. Print head 2202 comprises a microfluidic printing nozzle 2204, delineated in FIG. 22B. Microfluidic printing nozzle 2204 comprises an orifice 2206 configured to extrude material. Microfluidic printing nozzle 2204 further comprises a mixing chamber 2208, in fluid communication with orifice 2206, with an impeller 2210 disposed therein configured to mix the material, wherein mixing chamber 2208 is in thermal communication with a heating device 2212, a cooling device 2214, and—in certain embodiments—at least one temperature measuring device. Print head 2202 further comprises a first input comprising a first rotary positive displacement pump 2216 in fluid communication with mixing chamber 2208 of microfluidic printing nozzle 2204. Print head 2202 further comprises a second input comprising a second rotary positive displacement pump 2218 in fluid communication with mixing chamber 2208. Print head 2202 further comprises a motor 2220 mechanically connected to impeller 2210. In certain embodiments, motor 2220 is configured to rotate impeller 2210 at a rate of greater than 300 rotations per minute (RPM). In some embodiments, print head 2202 comprises a shaft seal 2242 (e.g., comprising a metal, graphite, graphene, and/or carbon nanotubes) to prevent backflow of the material in the mixing chamber. In certain embodiments, the heating device 2212 in thermal communication with mixing chamber 2208 is configured to heat mixing chamber 2208 to a temperature greater than 100 degrees Celsius.

First rotary positive displacement pump 2216 and second rotary positive displacement pump 2218 each have an individually controllable heating device 2212 and first melting zone 2222 and second melting zone 2224 configured for melting first solid polymer pellets 2226 and second solid polymer pellets 2228. In some embodiments, first solid polymer pellets 2226 are fed into print head 2202 through a pellet feed inlet 2240, and similarly for second solid polymer pellets 2228. In some embodiments, the flow rate of first rotary positive displacement pump 2216 and second rotary positive displacement pump 2218 is each individually controlled by first dosing motor 2230 and second dosing motor 2232, respectively. First dosing motor 2230 and second dosing motor 2232 may be electronically controllable by means of a controller.

In certain embodiments, a method for printing a three-dimensional polymeric part (e.g., thermoplastic part), using print head 2202 having microfluidic printing nozzle 2204 may be carried out. In certain embodiments, the method comprises heating, to a temperature greater than 100 degrees Celsius, by use of the heating device 2212 in thermal communication with mixing chamber 2208, mixing chamber 2208 of microfluidic printing nozzle 2204. In certain embodiments, the method comprises pumping, into mixing chamber 2208, by way of first melted polymer flow channel 2234 and second melted polymer flow channel 2236, a first fluid polymeric material and a second fluid polymeric material respectively, through a first inlet and a second inlet respectively, by use of first rotary positive displacement pump 2216 and second rotary positive displacement pump 2218 respectively. In certain embodiments, the method comprises actively mixing at least the first fluid polymeric material and the second fluid polymeric material using impeller 2210 in mixing chamber 2208. In certain embodiments, the method comprises extruding the mixture of at least the first fluid polymeric material and the second fluid polymeric material through orifice 2206 onto a substrate. Combinations of these method steps are also possible. Print head 2202 is shown having printed a part 2238 having a gradient in one or more material properties.

In some embodiments, the raw materials may not be identical, but have substantially the same composition. As a non-limiting example, all of the materials may comprise urethane linkages, but may have different molecular weights and different co-polymers in their backbone. However, the recycled mixture of these substantially similar thermoplastics may still be recycled into a commercially useful composition even if the recycled end product does not have identical properties to any of the pure starting materials. In some cases, the 3D-printed article may also be a component of the bottom of a shoe. As a non-limiting example, the 3D-printed article may be an insert into a midsole. The composition of the 3D-printed insert may be chosen to comprise or be of substantially the same composition as the midsole surrounding it (e.g., both thermoplastic polyurethanes). In some embodiments, the 3D-printed article may comprise or be a textile, or thin open-celled lattice-structure, or thin closed-celled lattice-structure. In other embodiments, the 3D-printed article may comprise both a textile and reinforcing features on top of it. As a non-limiting example, a textile or thin open-celled lattice or thin closed-celled lattice could be printed as a first portion, and then other features such as a heel counter, eyelets, and/or a toe box could be subsequently printed directly onto (e.g, on top of) the first portion. In some embodiments, the materials of the first portion and these features may have substantially the same composition. In some embodiments, a gradient in material properties may exist across any of these portions or features.

In one aspect, articles are provided. In some embodiments, an article may be an article of footwear (e.g., FIG. 28). In some embodiments, the article of footwear comprises an upper (e.g., upper 2806 of FIG. 28). The upper may comprise a textile (e.g., upper textile 2802 of FIG. 28) or polymer film. The upper may comprise a three-dimensionally printed feature (e.g., 3D printed upper feature 2804 of FIG. 28), e.g., comprising a thermoplastic material. In some embodiments, the three-dimensionally printed feature is directly attached to the textile or polymer film. In some embodiments, the majority of the weight of the upper comprises or consists of substantially the same thermoplastic material as that of the three-dimensionally printed feature. In some embodiments, the three-dimensionally printed feature comprises a first portion (e.g., first portion 2803 of 3D printed upper feature 2804 of FIG. 28) and a second portion (e.g., second portion 2805 of 3D printed upper feature 2804 of FIG. 28). In some embodiments, there is at least a 10% difference in a material property between the first portion and the second portion, and/or there is a gradient in a material property between the first portion and the second portion, wherein the material property is selected from the group consisting of: tensile elastic modulus, flexural stiffness, Shore A hardness, Shore D hardness, Asker C hardness, microindentation hardness, nanoindentation hardness, and color. In some embodiments, there is at least a 10% difference in tensile elastic modulus between the first portion and the second portion. In some embodiments, there is at least a 10% difference in Shore A hardness between the first portion and the second portion. In some embodiments, there is at least a 10% difference in microindentation hardness between the first portion and the second portion.

In certain embodiments, a feature (e.g., a three-dimensionally printed feature) comprises from one to five thousand layers of polymer, stacked directly onto one another if there is a plurality of layers in the feature. Each layer of a feature may be, e.g., greater than or equal to 0.05 mm, greater than or equal to 0.5 mm, greater than or equal to 0.75 mm, greater than or equal to 1 mm, or greater than or equal to 5 mm. Each layer of a feature may be, e.g., less than or equal to 5 mm, less than or equal to 3 mm, less than or equal to 2 mm, or less than or equal to 1.5 mm. Combinations of the above-referenced ranges are also possible (e.g., from 0.05 mm to 5 mm, from 0.75 mm to 2 mm). Other ranges are also possible. In some embodiments, at least one of the layers (e.g., each of the layers) could be of non-uniform thickness. In some embodiments, there could be several layers of polymer (e.g., 4, 5, 6, 7, 8, 9, 10, 100, 500, 1,000, 2,000, 3,000, 4,000, or more layers) in a feature. In certain embodiments, a feature comprises or consists of a lattice, e.g., an open-celled lattice or a closed-celled lattice. In some embodiments, the lattice comprises or consists of from two layers to 40 layers, inclusive. In some embodiments, a feature comprises or consists of a three-dimensionally printed part. In some embodiments, the three-dimensionally printed part has greater than or equal to 5,000 layers.

In some embodiments, the majority of the weight of the entire footwear article comprises or consists of substantially the same thermoplastic material as that of the three-dimensionally printed feature.

In some embodiments, the three-dimensionally printed feature comprises at least a section that is a single integrated material and has a gradient in at least one material property between a first portion and a second portion. In some embodiments, the material property is selected from the group consisting of: stiffness, tensile elastic modulus, Shore A hardness, Shore D hardness, microindentation hardness, nanoindentation hardness, flexural modulus, and color. In some embodiments, there is at least a 10% difference in Shore A hardness between the first portion and the second portion. In some embodiments, there is at least a 10% difference in microindentation hardness between the first portion and the second portion. In some embodiments, the three-dimensionally printed feature comprises at least a section that is a single integrated material and has a gradient in tensile elastic modulus between the first portion and the second portion.

In some embodiments, the three-dimensionally printed feature is attached to the textile or film without the use of an adhesive.

In some embodiments, at least a portion of the upper has a pigment containing inkjet ink disposed on at least one surface of the upper. In some embodiments, the pigment containing inkjet ink is disposed on an internal surface of a first textile, wherein the internal surface is at least partially visible through a second textile that is at least partially optically transparent. In some embodiments, the three-dimensionally printed feature is at least partially transparent, and the three-dimensionally printed feature has a pigment containing inkjet ink disposed on the feature.

In some embodiments, the thermoplastic material which the majority of the weight of the upper comprises is a thermoplastic polyurethane. In some embodiments, the thermoplastic material of which the majority of the weight of the upper consists is a thermoplastic polyurethane.

In some embodiments, at least a portion of the three-dimensionally printed feature is an open-celled lattice. In some embodiments, at least a portion of the three-dimensionally printed feature is a closed-celled lattice. In some embodiments, the three-dimensionally printed feature comprises a gradient in tensile elastic modulus. In some embodiments, the first portion has a Shore A hardness below 75 A, and the second portion has a Shore A hardness greater than 85 A; and wherein the three-dimensionally printed feature is a single integrated material.

In some embodiments, the three-dimensionally printed feature comprises a thermoplastic polyurethane.

Figure 28:
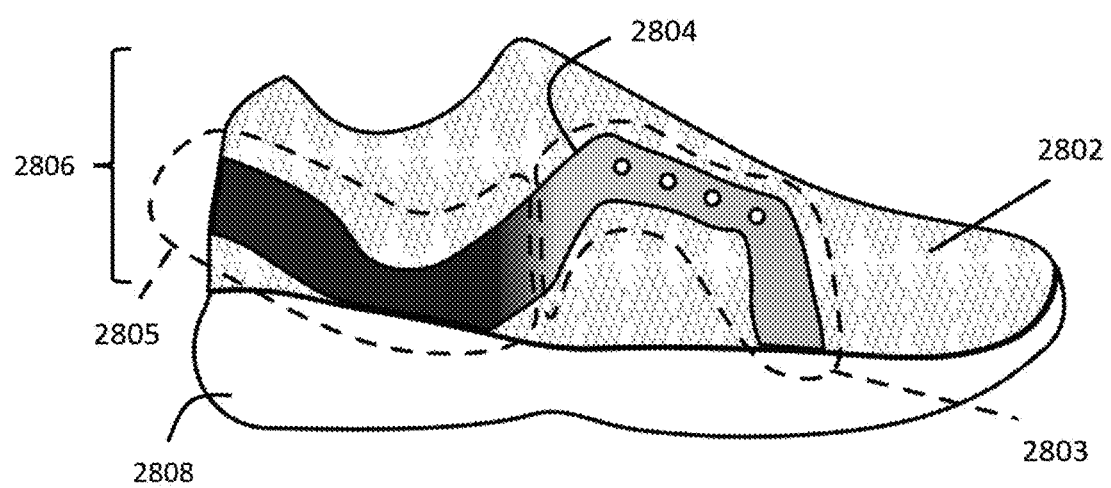
FIG. 28 is a schematic of an illustrative article of footwear, in accordance with some embodiments.

FIG. 28 is a schematic of an illustrative article of footwear, in accordance with some embodiments. The article of footwear of FIG. 28 comprises an upper 2806. Upper 2806 of FIG. 28 comprises an upper textile 2802. Upper 2806 of FIG. 28 further comprises a three-dimensionally (3D) printed upper feature 2804. In some embodiments, 3D printed upper feature 2804 comprises a thermoplastic material. In some embodiments, 3D printed upper feature 2804 is directly attached to upper textile 2802. In some embodiments, the majority of the weight of upper 2806 comprises or consists of substantially the same thermoplastic material as that of 3D printed upper feature 2804. 3D printed upper feature 2804 comprises a first portion 2803 and a second portion 2805. In some embodiments, there is at least a 10% difference, and/or a gradient, in a material property between first portion 2803 of 3D printed upper feature 2804 and second portion 2805 of 3D printed upper feature 2804, wherein the material property is selected from the group consisting of: tensile elastic modulus, flexural stiffness, Shore A hardness, Shore D hardness, Asker C hardness, microindentation hardness, nanoindentation hardness, and color. In some embodiments, there is at least a 10% difference in tensile elastic modulus between first portion 2803 of 3D printed upper feature 2804 and second portion 2805 of 3D printed upper feature 2804. In some embodiments, there is at least a 10% difference in Shore A hardness between first portion 2803 of 3D printed upper feature 2804 and second portion 2805 of 3D printed upper feature 2804. In some embodiments, there is at least a 10% difference in microindentation hardness between first portion 2803 of 3D printed upper feature 2804 and second portion 2805 of 3D printed upper feature 2804. It should be understood that other shapes and relative sizes of 3D printed upper feature 2804, of upper 2806 and of a midsole 2808, are also possible.

A substrate in a multi-axis deposition system may be any suitable substrate capable of receiving the material deposited by the print head. In some cases, the substrate may have a shape that enables facile deposition of the material of interest in a morphology of interest by the print head. As an example, the substrate may have a shape that substantially corresponds to the morphology of interest, such as a footwear last for footwear applications (e.g., as shown in FIG. 9). In other embodiments, the substrate may have a shape that substantially corresponds to a morphology of interest for an article of apparel (e.g., a bra cup for sports bra applications and/or for bra lining applications, an article substantially corresponding to the shape of a knee for knee brace applications, an article substantially corresponding to the shape of an ankle for ankle brace applications, an article substantially corresponding to the shape of a wrist for wrist brace applications, an article substantially corresponding to the shape of a shoulder for shoulder brace applications, and/or an article substantially corresponding to the shape of an arm for arm band applications). As another example, the substrate may be a mold or a portion of a mold. As a third example, the substrate may comprise a portion that is curved, and/or the substrate as a whole may be curved. For instance, the substrate may have a spherical shape, or a hemispherical shape. As a fourth example, the substrate may comprise two or more surfaces that are joined at facets. In some such cases, the substrate may be a platonic solid or may comprise a portion that is a platonic solid. In some embodiments, the substrate may be substantially flat. Other types of substrates are also possible.

In some embodiments, a multi-axis deposition system may comprise a substrate that is removable. The substrate may be configured to be positioned in the multi-axis deposition system during material deposition and removed after material deposition. In some embodiments, a multi-axis deposition system may comprise multiple substrates that may be added to the multi-axis deposition system prior to material deposition and/or removed from the multi-axis deposition system after material deposition. Each substrate may have a different shape (e.g., a different shoe size, a different cup size, a mold for a different type of apparel), or two or more substrates may have substantially the same shape.

As described above, one or more articles and/or substrates may be disposed on the substrate support prior to material deposition and/or during material deposition using the a multi-axis deposition system. The article(s) disposed on the substrate support may be configured to be positioned on the substrate support during material deposition and, optionally, removed from the substrate support after material deposition. In some embodiments, a multi-axis deposition system may be configured to deposit material onto a multiple articles successively, each of which may be added to the multi-axis deposition system prior to material deposition and/or removed from the multi-axis deposition system after material deposition. For example, a textile (e.g., a non-flat textile, an upper, a woven textile, a knit textile) may be disposed on the substrate support prior to material deposition, during material deposition, and/or after material deposition. In some embodiments, a multi-axis deposition system may be employed to deposit a reactive mixture as described above onto a textile to form a 3D-printed material on the textile and/or on a succession of textiles sequentially added to the substrate. In other embodiments, the multi-axis deposition system may be configured to deposit one or more thermoplastics onto a substrate.

In some embodiments, a multi-axis system may be configured to 3D-print materials with one or more advantageous properties. For example, the multi-axis system may be configured to 3D-print materials with a feature size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, the multi-axis system may be configured to 3D-print materials with a feature size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

In some embodiments, a 3D-printed material may be formed on an article disposed on a substrate support that is configured to interact with a detection system in a manner that promotes alignment of the 3D-printed article (and/or portions thereof) with respect to the article disposed on the substrate support and/or precision in the positioning of the 3D-printed article (and/or portions thereof) onto the article disposed on the substrate. For example, the article may comprise one or more features that may be detected by a detector. The detector may be in electronic communication (e.g., by use of a wired and/or wireless connection) with a print head configured to deposit a material onto the substrate support and article disposed thereon, and/or may be configured to transmit information to the print head configured to deposit a material onto the substrate support and article disposed thereon. In certain cases, the detector may be configured to detect information about the article disposed on the substrate, such as the location of the article (and/or a portion thereof) in space, with respect to the substrate, and/or with respect to the print head; the orientation of the article (and/or a portion thereof) in space, with respect to the substrate, and/or with respect to the print head; and/or one or more qualities associated with the article (e.g., the scale of the article, the skew of the article, the mirroring of the article, whether or not the article has undergone an affine transformation). The detector may send instructions to the print head and/or the substrate support based on some or all of the information it detects. For example, the detector may detect that the article is located in an undesirable position, and may send an instruction to the substrate support to translate and/or rotate so that the article is located in a desirable position. As a second example, the detector may detect that the article is located in a desirable position, and may send instructions to the print head to print onto the article and/or to translate and/or rotate to a desired position and then print onto the article. As a third example, the detector may detect that the article has undergone a certain amount of skew, and send instructions to the print head to modify its motion with respect to the article to account for the skew. Other types of instructions may also be sent.

In some embodiments, as also described elsewhere herein, an article disposed on a substrate support may be a fabric, such as a knitted fabric or a woven fabric. The fabrics may comprise one or more features which include one or more portions that are knitted or woven to form a pattern that may be detectable optically. The feature(s) may either be created inline (e.g., during the knitting or weaving process used to form the fabric), or may be added to the fabric after it has been formed. In some embodiments, the feature(s) may comprise portion(s) of a pattern (e.g., a repeating motif) knitted or woven into the fabric or printed onto the fabric.

As discussed herein, a 3D printer may be provided that is capable of printing 3D articles with non-uniform material compositions, such as a shoe sole, a shoe sole insert, and/or a shoe upper. Such 3D articles may comprise a gradient structure with at least one non-uniform property (e.g., color, average stiffness, average Shore A hardness, microindentation hardness, nanoindentation hardness, average pore size, average density, surface roughness, reflectivity, strength, elongation at break, tensile elastic modulus, and 100% modulus). These gradient structures may be formed by varying one or more printer settings (e.g., a ratio of two or more input materials to a mixing chamber, a spin speed of an impeller in the mixing chamber, a sequence of materials into a mixing chamber, and a position of one or more valves to control material inputs into the mixing chamber, total combined volumetric flow rate of one or more input materials to a mixing chamber, nozzle tip height relative to the substrate, target temperature of the mixing chamber and/or the substrate, target catalyst concentration of the resulting mixed material, target line width of the printed material, target fumed silica concentration of the printed composite, target viscosity of the printed composite at the point of exiting the nozzle, and target concentration of an additive) while a 3D printer is printing the part. For example, the gradient structure may be formed by varying the ratio of two material inputs into a mixing nozzle. The inventors have appreciated that existing techniques for generating printer instructions for a 3D printer, such as those implemented in conventional slicer software applications, may be unable to recreate these gradient structures. Accordingly, aspects of the present disclosure relate to a computer program that is configured to generate print instructions that comprise changes to printer settings while the print head is moving along a print path to accurately create these gradient structures.

The computer program may be configured to receive object information, such as a design file for a 3D article comprising a gradient structure (e.g., from a computer-aided design (CAD) program) and/or a print path for printing a 3D article (e.g., from a slicer application) with metadata indicative of material properties at various points along the print path, and output print instructions that may be provided to a 3D printer to accurately create the 3D article. The computer program may generate these print instructions by identifying gradient structures in the 3D article (e.g., a bounded volume in the 3D structure where the material properties are non-uniform) and identifying the appropriate set of printer settings for various points along the print path to create the gradient structure.

Figure 14:
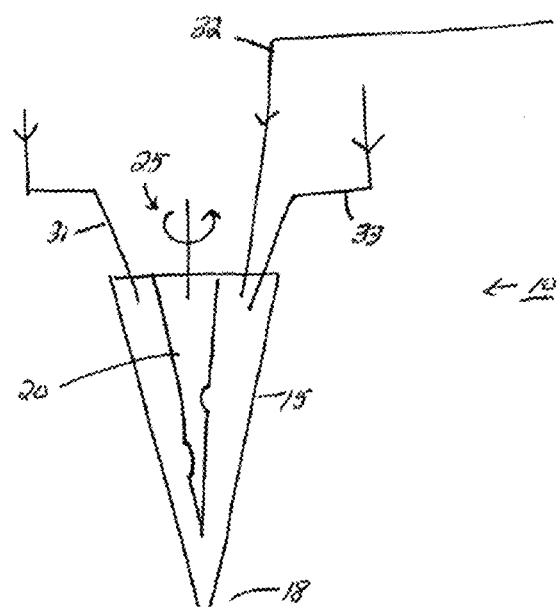
FIG. 14 illustrates a method for 3D printing an article according to certain embodiments of the invention.
Figure 15:
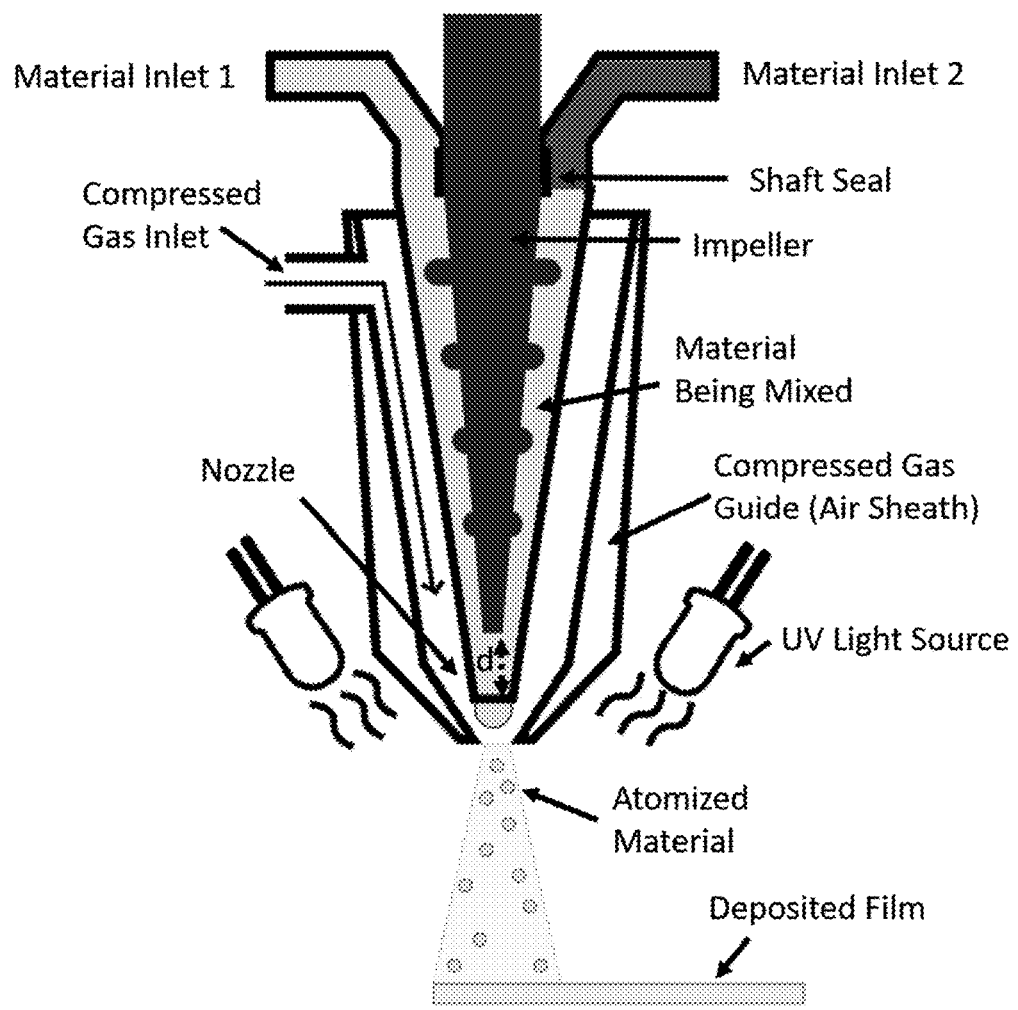
FIG. 15 is a schematic of an illustrative reactive spray print head with an integrated UV curing mechanism, in accordance with some embodiments.
Figure 16:
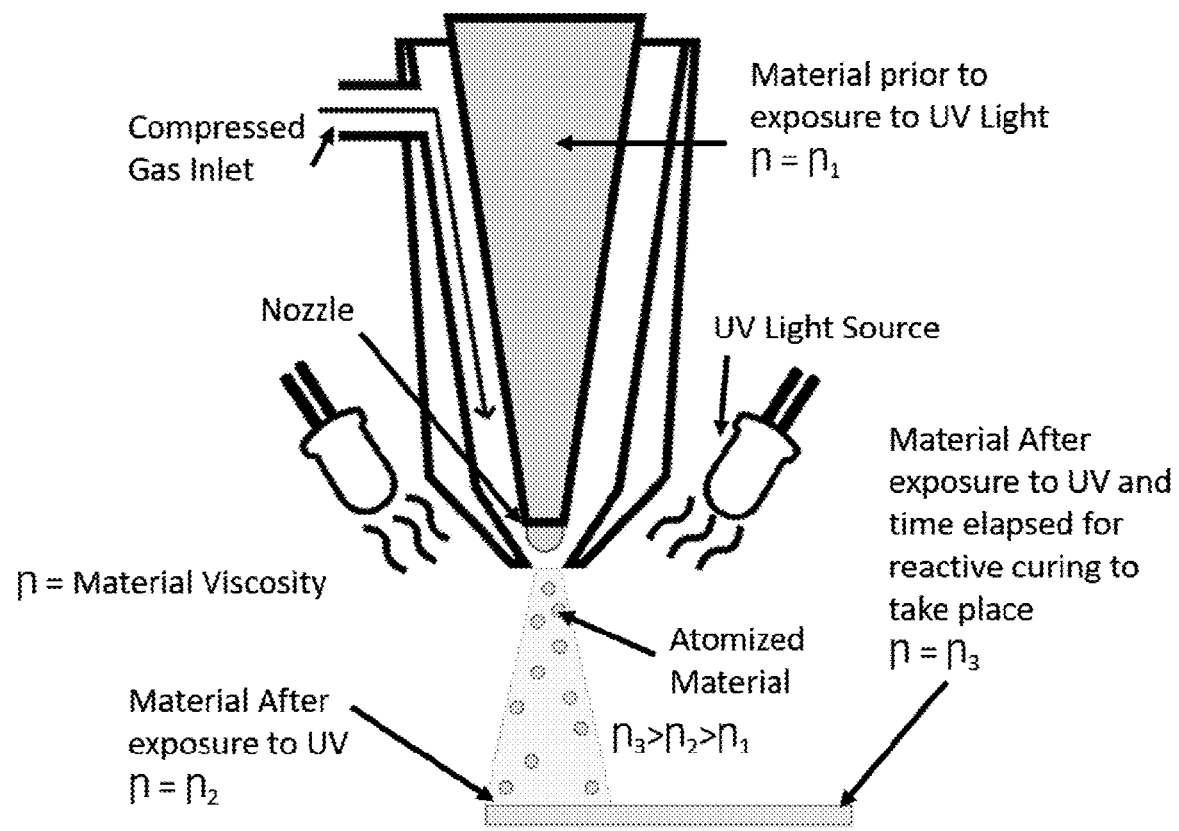
FIG. 16 is a schematic of an illustrative spray print head with an integrated UV curing mechanism, in accordance with some embodiments.
Figure 17:
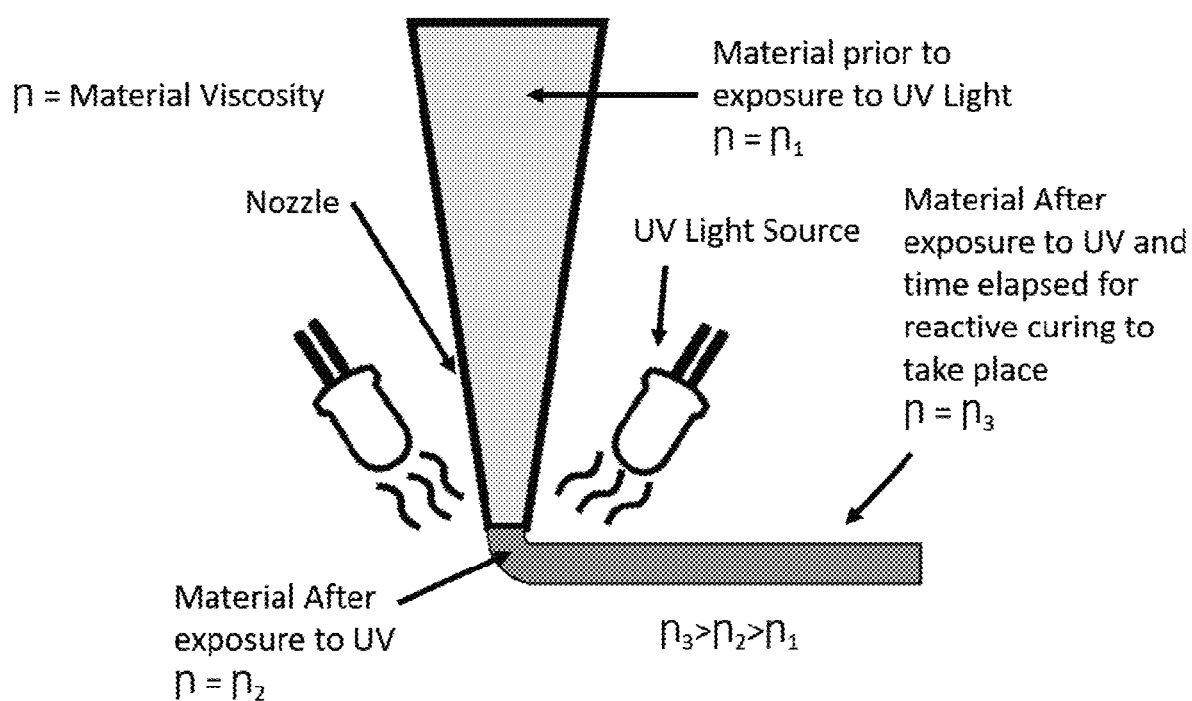
FIG. 17 is a schematic of an illustrative print head with an integrated UV curing mechanism, in accordance with some embodiments.
Figure 18:
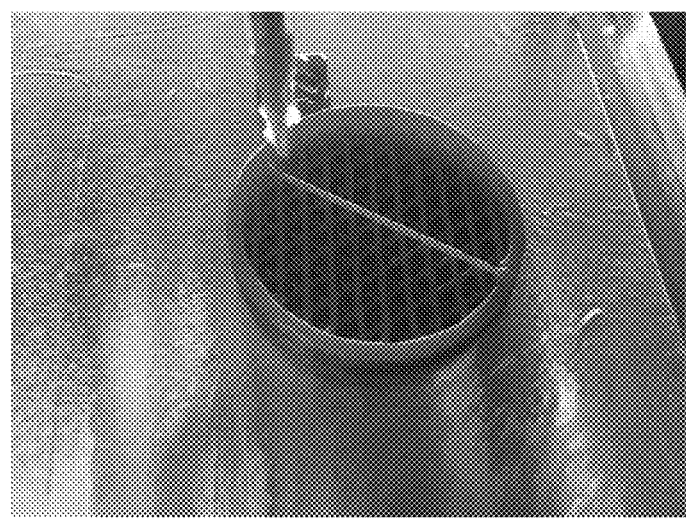
FIGS. 18-21 show several 3D-printed articles according to certain embodiments of the invention.
Figure 19:
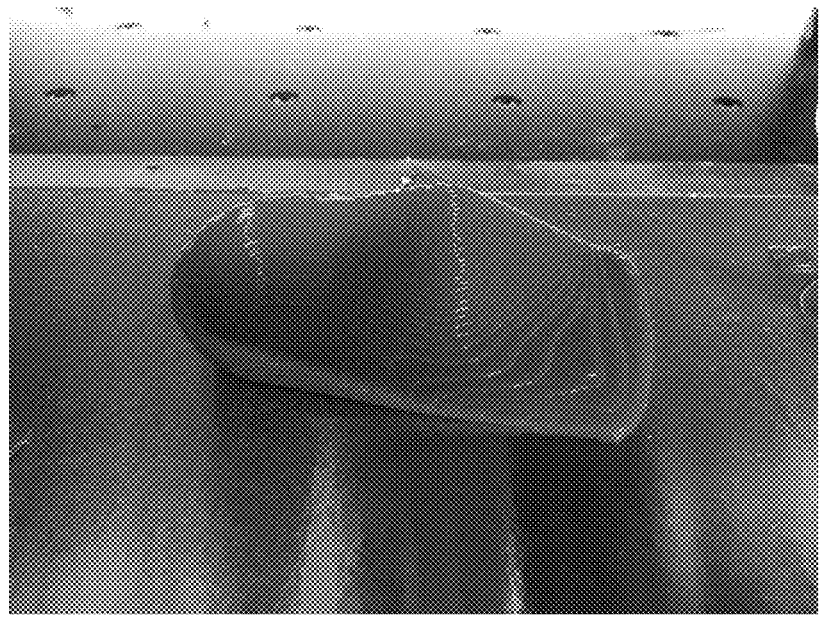
Figure 20:
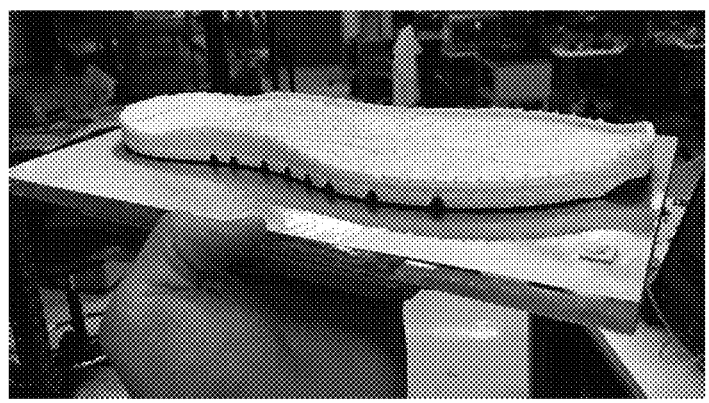
Figure 21:

FIG. 14 shows an example of a method for 3D-printing an article in accordance with some embodiments (e.g., on a multi-axis system as described above). In this figure, a device 10 for printing an article is shown, using techniques such as 3D printing. The device may include a nozzle 15, through which material is directed at a substrate through outlet 18. In some embodiments, the material may conformally coat the substrate after exiting through the nozzle. As described above, the substrate may be planar, or in some cases, the substrate may have a different shape (e.g., a curved shape). The substrate may thus be any suitable target for a material exiting the nozzle. For instance, the substrate may include a mold to which the material is applied or may be a component of an article of footwear (e.g., an upper). In some embodiments, the substrate itself may be produced by a 3D-printing process prior to 3D-printing the article. Without wishing to be bound by theory, printing onto 3D-printed substrates (e.g., 3D-printed molds, or 3D-printed textiles) may yield 3D-printed articles that are smooth and/or have curved surfaces. In some embodiments, the substrate may be scanned using one or more sensors prior to printing. In some embodiments, data received during scanning may at least partially determine one or more movements of the nozzle during printing.

Nozzle 15 in FIG. 14 is generally depicted as being conical or funnel-shaped, although it should be understood that this is by way of example only, and the nozzle may have any suitable shape able to direct a material at a substrate. Further non-limiting examples of methods for 3D printing may be seen in a U.S. provisional patent application filed on Feb. 27, 2017, entitled "Techniques and Systems for Three-Dimensional Printing of Foam and other Materials," incorporated herein by reference in its entirety.

In some embodiments, a substrate may be translated and/or rotated with respect to a nozzle as described above during a 3D-printing process (e.g., a multi-axis robot may translate the substrate with respect to the nozzle, which may allow material to be extruded onto various portions of the substrate). In some embodiments, the nozzle may be translated and/or with respect to the substrate as described above.

In addition, in some embodiments, the material within the nozzle may be subjected to heating or cooling. This may, for example, be used to melt the material, to control the viscosity of the material, to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5 degrees C. (° C.), at least 10 degrees C., at least 100 degrees C., at least 160 degrees C., at least 200 degrees C., or by other ranges such as those discussed herein. Any method may be used to heat or cool the material within the nozzle. For example, heating or cooling may be applied to the nozzle itself, and/or to material within the nozzle. Non-limiting examples include electrical heating, Peltier cooling, application of infrared light, or other techniques such as those discussed herein.

As mentioned, one or more fluids may enter the nozzle to be mixed together. The fluids may enter via a common inlet, and/or via separate inlets, for example, as is illustrated in FIG. 14 with inlets 31, 32, and 33. Although 3 inlets are illustrated in this figure, this is by way of example only, and in other embodiments, more or fewer inlets are also possible. The inlets may independently be at the same or different distances away from an outlet of the nozzle. In some cases, the fluids may react upon contact with each other; thus, the fluids are kept separate prior to entrance into the nozzle, for example, using one or more inputs and/or valves to control contact of the fluids with each other. For example, one or more valves may be present on one or more of the inlets to control the flow of fluid through the inlets, e.g., into the nozzle. Examples of valves that can be used include needle valves, ball valves, gate valves, butterfly valves, or other suitable types of valves. Additionally, other types of apparatuses to control fluid flow may also be used, in addition to and/or instead of valves.

Fluids entering a mixing nozzle may be provided to the mixing nozzle in a variety of suitable manners. In some embodiments, fluids enter a mixing nozzle by flowing therein from a material supply tube. Material supply tubes may be connected to sources of the material, such as material reservoirs. In some embodiments, material supply tubes and/or material reservoirs may be configured to be held at a desired temperature. For instance, fluid may enter a mixing nozzle from a heated material supply tube and/or from a material supply tube fluidically connected to a heated material reservoir. As another example, fluid may enter a mixing nozzle from a cooled material supply tube and/or from a material supply tube fluidically connected to a cooled material reservoir. Without wishing to be bound by any particular theory, it is believed that temperature control may advantageously prevent and/or reduce crystallization of one or more components of one or more of the fluids entering the mixing nozzle and/or prevent and/or reduce phase separation of two or more components of one or more of the fluids entering the mixing nozzle. It may also allow materials that are solid at room temperature to be printed in liquid form.

Some embodiments are directed to methods of printing an article, which may include flowing at least two materials into a mixing chamber. In some embodiments, at least one of the materials is polymeric. The method may involve in some embodiments mixing the at least two materials in the mixing chamber containing an impeller to form a mixture. The method may also include depositing the mixture onto a textile. In some embodiments, the mixed material flows through an orifice and onto the surface of a textile.

In some embodiments, the method may involve flowing the at least two materials into the mixing chamber while rotating the impeller in the mixing chamber. The impeller may cause two or more materials in the mixing chamber to mix. In some embodiments, the mixing chamber contains at least a portion of the impeller. The term "mixing chamber" may refer to the volume in which the at least two materials that are mixed together occupy from when they first touch each other, to when they stop being mechanically influenced by active motion of a mixing part (e.g., impeller). In some embodiments, the mixing chamber and the impeller share at least some volume, e.g. the impeller occupies at least some of the dead volume of the mixing chamber.

In some embodiments, the method may involve flowing the at least two materials into the mixing chamber through at least three discrete material inlets. In such embodiments, there may be at least three materials flowed into the mixing chamber. In some embodiments, the method may involve flowing the at least two materials into the mixing chamber through at least four discrete material inlets. In such embodiments, there may be at least three or four materials flowed into the mixing chamber.

In some embodiments, the mixture is a liquid. In some embodiments the mixture is in direct fluid communication with the mixing chamber during the time of deposition onto the substrate (e.g., textile). As a non-limiting example, the mixture is not jetted into discrete droplets from a standoff distance from the substrate (e.g., textile), but instead contacts simultaneously an outlet from the mixing chamber (e.g., nozzle orifice) and the substrate (e.g., textile) while the mixture is continuous with itself.

In some embodiments, the textile onto which the mixture is deposited is substantially flat (e.g., it may be a flat plate). In some embodiments, the textile conforms to a substrate that is curved in one or more dimensions (e.g., two or three dimensions). The textile may be disposed on a fixture, such as a fixture configured to interact with a 3D-printer. In some embodiments, the textile is supported by a belt that can translate the textile in one or more dimensions (e.g., two or three dimensions) and/or through a sequence of one or more processes. In some embodiments, the textile is handled in a roll to roll process. In some embodiments, the textile itself acts as a belt that can move the textile surface with respect to the mixing chamber. In some embodiments, the textile is a component of a footwear upper (e.g., a shoe upper). In some embodiments, the textile is a component of apparel, a component of an article of sportswear, a component of an article of sporting goods (e.g., a glove, a grip, a tent), a component of an article of clothing (e.g., a shirt), and/or a component of a bag. In some embodiments, the textile is a component of a knit shoe upper. In some embodiments, the textile is an article of apparel, an article of sportswear, an article of sporting goods, an article of clothing (e.g., a shirt), and/or a bag.

In certain cases, a mixture may be deposited onto an article disposed on a substrate support. The article may be a component of an article of footwear (e.g., an upper), or may be an article of footwear (e.g., a shoe). The substrate support may be configured to hold the article in an advantageous shape, such as an advantageous shape for footwear applications.

In some embodiments, at least one of the at least two materials comprises a filler and the article is a polymeric composite. In some embodiments, at least one of the at least two materials comprises isocyanate groups. In some embodiments, at least one of the at least two materials have functional groups (e.g., chemical functional groups) selected from the group consisting of alcohol groups, amine groups, or combinations thereof. In some cases, more than two materials may be flowed into a mixing chamber (e.g., three materials, four materials, or more materials). In some embodiments, at least one of the materials comprise or are thermoplastic polyurethanes. In some cases, at least two of the material inputs comprise or are thermoplastic polyurethanes. In some cases, the thermoplastic polyurethanes may be polyester-based, in other cases the thermoplastic polyurethanes may be polyether-based. When two or more materials are flowed into the mixing chamber, each material may comprise different functional groups from each other material, or two or more materials may comprise the same functional group. In the case that they comprise or are thermoplastics, each material may have a different material property (e.g., stiffness, color, Shore A hardness, microindentation hardness, nanoindentation hardness) from one another. The materials may also have different viscosities and melting points from one another.

In some cases, 3D-printed foams (e.g., closed-cell foams, open-cell foams, etc.) may be prepared as discussed herein using various inputs, as described herein. For instance, the foam density may be varied by varying the amount of added gas, the amount of added water (e.g., in water-blown foam applications), the amount of added chemical blowing agent, etc. As another example, the foam density constant may be held constant, but the cross-link density or isocyanate content may be varied to change properties such as the elasticity, elongation, or stiffness of the foam. In some cases, an open-celled or closed-cell foam may be created by printing an open-celled or closed-cell lattice structure using a solid elastomer.

In some embodiments, it can be useful deposit material onto surfaces by spraying rather than by extrusion alone through a nozzle. Advantages of spraying relative to extrusion alone may include but are not limited to deposition of thinner films with no extrusion lines; reduced sensitivity to nozzle standoff distance from the substrate; and/or a capacity to create wider strips of material in one pass to reduce cycle time. Other advantages of spraying relative to extrusion alone may include limited accumulation or no accumulation of cured material on the nozzle, which may be because spraying may not require the spray nozzle to come into direct fluid communication with material that has already been deposited. In addition, coatings made by spraying can be applied conformally to three-dimensional (3D) surfaces without precise alignment or 3D tool-pathing.

In some embodiments, it is possible to make slight modifications to a mixing nozzle (e.g., a 4-input dynamic mixing nozzle) to convert it into a spray nozzle. In order to do this, a compressed gas guiding sheath fluidly connected with a compressed gas source may be attached around the outside of the nozzle. In some embodiments, a configuration of an impeller disposed in the mixing chamber of the mixing nozzle ensures that a small mixing volume is retained such that rapid changes in the sprayed material composition can be executed. In some embodiments, the compressed gas guiding sheath (e.g., air guiding sheath) is configured to guide the flow of compressed gas from a compressed gas source to atomize the output of the nozzle into small droplets immediately upon exiting the nozzle. In some embodiments, the small droplets are then propelled through the air to land on a target substrate. In some embodiments, ratio(s) (e.g., volume ratios) of the inputs (e.g., 4 inputs) into the mixing chamber can be changed in space and time to vary the composition of the material that is sprayed. In some embodiments, the geometry of the compressed gas guiding sheath and/or the applied pressure from the compressed gas can be used to change the shape and velocity of the cone of atomized material that is deposited. In some embodiments, the standoff distance from the substrate can be used to control the width of the sprayed strips.

In some embodiments, the formulation comprises two or more parts, and passing a formulation through the print head involves flowing at least two of the two or more parts of the formulation through a respective material inlet of the two or more material inlets into the printing nozzle. In some embodiments, the formulation comprises three or more parts, and passing a formulation through the print head involves flowing at least three of the three or more parts of the formulation through a respective material inlet of three or more material inlets into the printing nozzle. In some embodiments, the formulation comprises four or more parts, and passing a formulation through the print head involves flowing at least four of the four or more parts of the formulation through a respective material inlet of four or more material inlets into the printing nozzle.

In certain embodiments, a 3D-printed article that comprises at least two portions (e.g., a 3D-printed article that is a component of an athletic footwear upper which comprises at least a first portion and a second portion, a 3D-printed article that is an insert for a midsole which comprises at least a first portion and a second portion, a 3D-printed article that comprises an elastomer and comprises at least a first portion and a second portion) may have a ratio of the average stiffness of the solid components of the second portion to the average stiffness of the solid components of first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1,000, greater than or equal to 2,000, greater than or equal to 5,000, or greater than or equal to 10,000. In some embodiments, a ratio of the average stiffness of the solid components of the second portion of the 3D-printed article to the first portion of the 3D-printed article may be less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, or less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 20,000, or greater than or equal to 1.05 and less than or equal to 10). Other ranges are also possible. In some embodiments, the average stiffness of the solid components of may vary smoothly from the average stiffness of the solid components of first portion to the average stiffness of the solid components of second portion.

In some embodiments, a 3D-printed article (e.g., a 3D-printed article that is a foam such as a closed-cell foam, a 3D-printed article that is not a foam, a 3D-printed article that comprises an elastomer, a 3D-printed article that comprises or is an elastomeric open-celled lattice or an elastomeric closed-celled lattice) may have at least one portion with an average hardness (e.g., an average Shore A hardness, an average Shore D hardness, an average Asker C hardness, an average microindentation hardness, an average nanoindentation hardness) of greater than or equal to 1, greater than or equal to 2, greater than or equal to 5, greater than or equal to 10, greater than or equal to 15, greater than or equal to 20, greater than or equal to 25, greater than or equal to 30, greater than or equal to 35, greater than or equal to 40, greater than or equal to 45, greater than or equal to 50, greater than or equal to 55, greater than or equal to 60, greater than or equal to 65, greater than or equal to 70, greater than or equal to 75, greater than or equal to 80, greater than or equal to 90, or greater than or equal to 100. In some embodiments, a 3D-printed article may have an average hardness (e.g., an average Shore A hardness, an average Shore D hardness, an average Asker C hardness, an average microindentation hardness, an average nanoindentation hardness) of less than or equal to 125, less than or equal to 100, less than or equal to 90, less than or equal to 80, less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 25, less than or equal to 20, less than or equal to 15, less than or equal to 10, less than or equal to 5, or less than or equal to 2. Combinations of the above-referenced ranges are also possible (e.g., greater than or equal to 1 and less than or equal to 125). The average hardness may be measured by the procedure described in ASTM E384. The Shore A hardness of the 3D-printed article may instead be measured, for example, by using a Shore A durometer. Microindentation hardness may be measured using a Vickers microhardness testing device or other similar device, using methods known to those of ordinary skill in the art. For example, microindentation hardness may be measured by the procedure described in ASTM E384.

In certain embodiments, a 3D-printed article that comprises at least two portions (e.g., a 3D-printed article that is a closed-cell foam which comprises at least a first portion and a second portion, a 3D-printed article that is not a foam which comprises at least a first portion and a second portion, a 3D-printed article that comprises an elastomer and comprises at least a first portion and a second portion, a 3D-printed article that comprises or is an elastomeric open-celled lattice or an elastomeric closed-celled lattice that comprises at least a first portion and a second portion) may have a ratio of the average hardness (e.g., average Shore A hardness, average Shore D hardness, average Asker C hardness, average microindentation hardness, average nanoindentation hardness) of the second portion of the to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average hardness (e.g., average Shore A hardness, average Shore D hardness, average Asker C hardness, average microindentation hardness, average nanoindentation hardness) of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average hardness (e.g., average Shore A hardness, average Shore D hardness, average Asker C hardness, average microindentation hardness, average nanoindentation hardness) may vary smoothly from the average hardness (e.g., average Shore A hardness, average Shore D hardness, average Asker C hardness, average microindentation hardness, average nanoindentation hardness) of the first portion to the average hardness (e.g., average Shore A hardness, average Shore D hardness, average Asker C hardness, average microindentation hardness, average nanoindentation hardness) of the second portion.

In certain embodiments in which a 3D-printed article that comprises at least one portion (e.g., a 3D-printed article that is a closed-cell foam which comprises at least a first portion, a 3D-printed article that is not a foam and comprises at least one portion, a 3D-printed article that comprises an elastomer and comprises at least one portion), the color in the first portion may be one or more of red, orange, yellow, green, blue, indigo violet, pink, purple, white, black, gray, etc. The color may be a pastel color, a royal color, a light color, a dark color, or any other color. The color may have any suitable saturation.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average flexural modulus of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1,000, greater than or equal to 2,000, greater than or equal to 5,000, or greater than or equal to 10,000. In some embodiments, a ratio of the average flexural modulus of the second portion of the 3D-printed article to the first portion of the 3D-printed article may be less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 20,000, or greater than or equal to 1.05 and less than or equal to 10). Other ranges are also possible. In some embodiments, the average flexural modulus may vary smoothly from the average flexural modulus of the first portion to the average flexural modulus of the second portion.

In some embodiments, a 3D-printed article (e.g., a 3D-printed articles that is a foam such as a closed-cell foam, a 3D-printed article that is not a foam, a 3D-printed article that comprises an elastomer) may have an average elastic modulus (i.e., Young's modulus) of greater than or equal to 1 kPa, greater than or equal to 10 kPa, greater than or equal to 100 kPa, greater than or equal to 1 MPa, greater than or equal to 10 MPa, greater than or equal to 0.1 GPa, greater than or equal to 0.2 GPa, greater than or equal to 0.5 GPa, greater than or equal to 1 GPa, greater than or equal to 2 GPa, greater than or equal to 5 GPa. In some embodiments, the 3D-printed article may have an average elastic modulus of less than or equal to 10 GPa, less than or equal to 5 GPa, less than or equal to 2 GPa, less than or equal to 1 GPa, less than or equal to 0.5 GPa, less than or equal to 0.2 GPa, less than or equal to 0.1 GPa, less than or equal to 10 MPa, less than or equal to 1 MPa, less than or equal to 100 kPa, or less than or equal to 10 kPa. Combinations of the above-referenced ranges are also possible (e.g., greater than or equal to 1 kPa and less than or equal to 10 GPa, or greater than or equal to 0.1 GPa and less than or equal to 10 GPa). Other ranges are also possible. Other ranges are also possible. The average elastic modulus of the 3D-printed article may be measured by tensile testing or other suitable techniques known to those of ordinary skill in the art.

In certain embodiments, a 3D-printed article that comprises at least one portion (e.g., a 3D-printed article that is a closed-cell foam which comprises at least a first portion, a 3D-printed article that is not a foam and comprises at least a first portion, a 3D-printed article that comprises an elastomer and at least a first portion) may have an elastic modulus (i.e., Young's modulus) of the first portion of greater than or equal to 1 kPa, greater than or equal to 10 kPa, greater than or equal to 100 kPa, greater than or equal to 1 MPa, greater than or equal to 10 MPa, greater than or equal to 0.1 GPa, greater than or equal to 0.2 GPa, greater than or equal to 0.5 GPa, greater than or equal to 1 GPa, greater than or equal to 2 GPa, greater than or equal to 5 GPa. In some embodiments, the first portion of the 3D-printed article may have an elastic modulus of less than or equal to 10 GPa, less than or equal to 5 GPa, less than or equal to 2 GPa, less than or equal to 1 GPa, less than or equal to 0.5 GPa, less than or equal to 0.2 GPa, less than or equal to 0.1 GPa, less than or equal to 10 MPa, less than or equal to 1 MPa, less than or equal to 100 kPa, or less than or equal to 10 kPa. Combinations of the above-referenced ranges are also possible (e.g., greater than or equal to 1 kPa and less than or equal to 10 GPa, or greater than or equal to 0.1 GPa and less than or equal to 10 GPa). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have an elastic modulus (i.e., Young's modulus) of the second portion of greater than or equal to 1 kPa, greater than or equal to 10 kPa, greater than or equal to 100 kPa, greater than or equal to 1 MPa, greater than or equal to 10 MPa, greater than or equal to 0.1 GPa, greater than or equal to 0.2 GPa, greater than or equal to 0.5 GPa, greater than or equal to 1 GPa, greater than or equal to 2 GPa, greater than or equal to 5 GPa. In some embodiments, the second portion of the 3D-printed article may have an elastic modulus of less than or equal to 10 GPa, less than or equal to 5 GPa, less than or equal to 2 GPa, less than or equal to 1 GPa, less than or equal to 0.5 GPa, less than or equal to 0.2 GPa, less than or equal to 0.1 GPa, less than or equal to 10 MPa, less than or equal to 1 MPa, less than or equal to 100 kPa, or less than or equal to 10 kPa. Combinations of the above-referenced ranges are also possible (e.g., greater than or equal to 1 kPa and less than or equal to 10 GPa, or greater than or equal to 0.1 GPa and less than or equal to 10 GPa). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have a ratio of the elastic modulus (i.e., Young's modulus) of the second portion to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the elastic modulus of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the elastic modulus may vary smoothly from the elastic modulus of the first portion to the elastic modulus of the second portion.

In some embodiments, a 3D-printed article (e.g., a 3D-printed articles that is a foam such as a closed-cell foam, a 3D-printed article that is not a foam, a 3D-printed article that comprises an elastomer) may comprise one or more macrovoids with an average cross-sectional diameter of greater than or equal to 0.5 mm, greater than or equal to 1 mm, greater than or equal to 2 mm, greater than or equal to 5 mm, greater than or equal to 1 cm, greater than or equal to 2 cm, greater than or equal to 5 cm, or greater than or equal to 10 cm. In some embodiments, the 3D-printed article may comprise one or more macrovoids with an average cross-sectional diameter of less than or equal to 20 cm, less than or equal to 10 cm, less than or equal to 5 cm, less than or equal to 2 cm, less than or equal to 1 cm, less than or equal to 5 mm, less than or equal to 2 mm, or less than or equal to 1 mm. Combinations of the above-referenced ranges are also possible (e.g., greater than or equal to 0.5 mm and less than or equal to 5 cm). Other ranges are also possible. In some embodiments, one or more macrovoids may span the entire length of the shoe. The average cross-sectional diameter of the macrovoids may be measured by microscopy or other suitable techniques. In some embodiments, one or more of the macrovoids may not have an intersecting interface. As would be known to one of ordinary skill in the art, an intersecting interface is a junction between a first material formed by a first molding process and a second material formed by a second molding process onto the first material. Intersecting interfaces typically comprise at least one of the following features: a lack of chemical bonds across the interface (e.g., a lack of covalent bonds across the interface), one or more defects, one or more characteristic markings indicating lamination (e.g., one or more hemispherical indentations), non-uniform density across the interface, and/or conformations of the polymer chains at the interface which are different than the polymer chain conformations in the bulk material on either side of the interface. In some cases, intersecting interfaces show a step change in one or more of the following properties across the interface: average pore size, density, stiffness, Shore A hardness, microindentation hardness, nanoindentation hardness, degree of cross-linking, chemical composition, color, abrasion resistance, thermal conductivity, electrical conductivity, stiffness anisotropy, elastic modulus, flexural modulus, filler content, opacity, conductivity, and breathability.

In some embodiments, a 3D-printed article may comprise one or more portions that are open-cell foams and for which air makes up greater than 5 vol % of the open-cell foam, greater than or equal to 10 vol % of the open-cell foam, greater than or equal to 15 vol % of the open-cell foam, greater than or equal to 20 vol % of the open-cell foam, greater than or equal to 25 vol % of the open-cell foam, greater than or equal to 30 vol % of the open-cell foam, greater than or equal to 35 vol % of the open-cell foam, greater than or equal to 40 vol % of the open-cell foam, or greater than or equal to 45 vol % of the open-cell foam. In some embodiments, a 3D-printed article may comprise one or more portions that are open-cell foams and for which air makes up less than or equal to 50 vol % of the open-cell foam, less than or equal to 45 vol % of the open-cell foam, less than or equal to 40 vol % of the open-cell foam, less than or equal to 35 vol % of the open-cell foam, less than or equal to 30 vol % of the open-cell foam, less than or equal to 25 vol % of the open-cell foam, less than or equal to 20 vol % of the open-cell foam, less than or equal to 15 vol % of the open-cell foam, or less than or equal to 10 vol % of the open-cell foam. Combinations of the above-referenced ranges are also possible (e.g., greater than or equal to 30 vol % and less than or equal to 50 vol %). Other ranges are also possible. The vol % of air within an open-cell foam may be determined by optical microscopy of sections of the open cell foam followed by image analysis of the sections to determine the volume fraction of the open-cell foam that is air.

As described above, in certain embodiments a 3D-printed article (e.g., a 3D-printed articles that is a foam such as a closed-cell foam, a 3D-printed article that is not a foam, a 3D-printed article that comprises an elastomer) may comprise at least a first portion and a second portion that interpenetrate. In some embodiments, the first portion may form a skeleton-like structure that spans the second portion. For example, a 3D-printed article may comprise a first portion with a skeleton-like structure that is stiffer than a second portion in which it is embedded. This may be achieved in some cases by varying the stiffness of the material being extruded from a nozzle during a 3D-printing process.

In one aspect, a foam may be printed (e.g., via 3D-printing) into a structure defining a plurality of cells, i.e., into a foam-like structure. Thus, a foam may be printed as part of a larger foam-like structure, e.g., where the walls of the foam-like structure (e.g., defining cells of the foam-like structure themselves are foams having cells. The foam-like structure may have open cells, closed cells, or any combination of open and closed cells, independently of the structure of the foam itself forming the foam-like structure.

As described above, certain embodiments relate to methods for 3D printing a mixture onto a substrate. The substrate may be any suitable target for a material exiting a nozzle. In some cases, the substrate is planar, although in other cases, the substrate is non-planar (e.g., curved). For instance, the substrate may be a mold (e.g., the mold of a shoe), to which a material may be introduced. In some cases, the material may be relatively fluid and able to conform to contours within the substrate (e.g., if the substrate is a mold). In some such embodiments, the substrate may have one or more morphological features that are desirable for an external surface of the 3D-printed article (e.g., a desirable surface texture, a desirable curvature). However, in other cases, the material may be relatively solid, e.g., having a defined shape, upon deposition onto the substrate, such as is discussed herein.

3D-printed articles for use in footwear may be suitable for use in any type of footwear. Non-limiting examples of footwear include athletic footwear, shoes, sneakers, tennis shoes, basketball shoes, sandals, shoes appropriate for work, boots, booties, footwear comprising a heel of at least one inch, footwear lacking a heel or comprising a heel of less than one inch, boots, booties, basketball shoes, hiking boots, dress shoes, orthotics, bunion orthotics, ski boots and ski boots. Footwear comprising a 3D-printed article as described herein may be appropriate for men, women, and/or children.

In some embodiments, elements of one or more designs for article(s) of footwear or other apparel comprising 3D-printed elements are considered.

Figure 29:
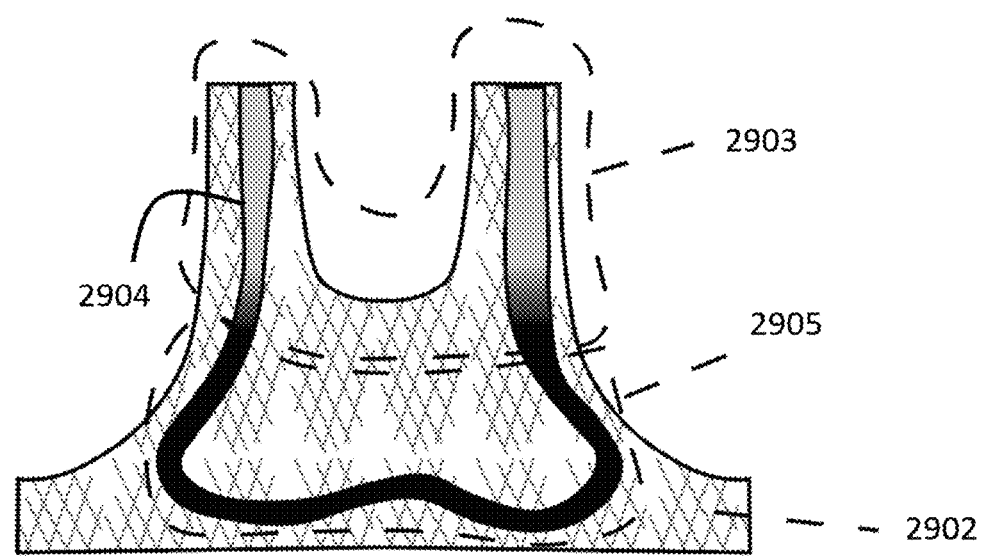
FIG. 29 is a schematic of an illustrative article of apparel (e.g., bra), in accordance with some embodiments.

In some embodiments, an article may be an article of apparel (e.g., FIG. 29). In some embodiments, the article of apparel comprises a textile (e.g., apparel textile 2902 of FIG. 29) or polymer film. In some embodiments, the article of apparel comprises a three-dimensionally printed feature (e.g., 3D printed apparel feature 2904 of FIG. 29), e.g., comprising a thermoplastic material. In some embodiments, the three-dimensionally printed feature is directly attached to the textile or polymer film. In some embodiments, the majority of the weight of the article of apparel comprises or consists of substantially the same thermoplastic material as that of the three-dimensionally printed feature. In some embodiments, the three-dimensionally printed feature comprises a first portion (e.g., first portion 2903 of 3D printed apparel feature 2904 of FIG. 29) and a second portion (e.g., second portion 2905 of 3D printed apparel feature 2904 of FIG. 29). In some embodiments, there is at least a 10% difference, and/or a gradient, in tensile elastic modulus and/or Shore A hardness and/or microindentation hardness between the first portion and the second portion.

In some embodiments, the textile or polymer film is not three-dimensionally printed. In some embodiments, the thermoplastic material which the majority of the weight of the article of apparel comprises is a thermoplastic polyurethane. In some embodiments, the textile or polymer film is not three-dimensionally printed. In some embodiments, the thermoplastic material of which the majority of the weight of the article of apparel consists is a thermoplastic polyurethane.

FIG. 29 is a schematic of an illustrative article of apparel (e.g., bra), in accordance with some embodiments. The article of apparel of FIG. 29 comprises an apparel textile 2902. The article of apparel of FIG. 29 further comprises a three-dimensionally (3D) printed apparel feature 2904. In some embodiments, 3D printed apparel feature 2904 comprises a thermoplastic material. In some embodiments, 3D printed apparel feature 2904 is directly attached to apparel textile 2902. In some embodiments, the majority of the weight of the article of apparel comprises or consists of substantially the same thermoplastic material as that of 3D printed apparel feature 2904. 3D printed apparel feature 2904 comprises a first portion 2903 and a second portion 2905. In some embodiments, there is at least a 10% difference, and/or a gradient, in tensile elastic modulus and/or Shore A hardness and/or microindentation hardness between first portion 2903 of 3D printed apparel feature 2904 and second portion 2905 of 3D printed apparel feature 2904. In some embodiments, there is at least a 10% difference, and/or a gradient, in a material property between first portion 2903 of 3D printed apparel feature 2904 and second portion 2905 of 3D printed apparel feature 2904, wherein the material property is selected from the group consisting of: tensile elastic modulus, flexural stiffness, Shore A hardness, Shore D hardness, Asker C hardness, microindentation hardness, nanoindentation hardness, and color. It should be understood that other shapes and relative sizes of 3D printed apparel feature 2904 and apparel textile 2902 are also possible.

In some embodiments, an article of footwear or apparel comprising 3D-printed elements may be primarily composed of substantially the same thermoplastic material. The article of footwear (e.g., shoe) or apparel may comprise a composition that is greater than 50% by weight the same type of thermoplastic, greater than 60% by weight the same type of thermoplastic, greater than 70% by weight the same type of thermoplastic, greater than 80% by weight the same type of thermoplastic, greater than 90% by weight the same type of thermoplastic, greater than 95% by weight the same type of thermoplastic, or greater than 98% by weight the same type of thermoplastic. As used herein, the term "primarily composed of" regarding a composition, material or article may refer to at least at least 50 volume %, at least 50 weight %, and/or at least 50 mass % of the composition, material or article. Suitable examples of thermoplastics include, but are not limited to: thermoplastic polyurethanes (TPU), thermoplastic elastomers (TPE), thermoplastic polyolefins, thermoplastic polyesters, polyester terephthalates, polyamides, nylons, acrylonitrile-butadiene-styrene copolymers, polyethylenes, polyether polyamide co-polymers, polybutylene-terephthalate polyether copolymers, and polybutylene-terephthalate polyester copolymers. In some cases, the thermoplastics in different portions of the article of footwear or apparel may be substantially the same, also referred to as similar but not identical, also referred to as substantially similar (e.g., two or more thermoplastic polyurethanes with different molecular weights and/or different material properties). The thermoplastics of the article of footwear or apparel may have different form factors but similar composition (e.g., a thermoplastic polyurethane foam, and a thermoplastic polyurethane elastomer). The thermoplastics of the article of footwear or apparel may have similar functional groups but have variations in composition (e.g., a polyester thermoplastic polyurethane and a polyether-based thermoplastic polyurethane). In some embodiments, 3D-printed components may have the same or similar composition as the majority of the thermoplastic in other components of the article of footwear or apparel. In some embodiments, the article of footwear or apparel may comprise or consist of two or more portions (e.g., an upper and a bottom unit) that are designed to be separated via a process (e.g., heating and pulling apart). In some cases, the adhesive that holds the shoe upper onto the bottom unit (e.g., midsole) may be selected to have a substantially similar composition to that of the rest of the upper. A non-limiting example may include a TPU adhesive on a TPU textile, with TPU 3D-printed features attached to the TPU adhesive, and a TPU strobel board. In this way, the entire upper may be recycled while using a bottom unit that cannot be effectively recycled in the same stream. Other material compositions are also possible. In some embodiments, the 3D-printed article that is at least a portion of an article of footwear or apparel, may have more than one portion, and may have variations in mechanical properties between those portions. In some embodiments, the 3D-printed article may have a gradient in one or more material properties between two or more portions. In some embodiments, the material properties that are varied between portions may be selected from the group consisting of: stiffness, color, Shore A hardness, Asker C hardness, Shore D hardness, microindentation hardness, nanoindentation hardness, elastic modulus, flexural stiffness, strength, opacity, and filler composition. Variation in more than one property at the same time is also possible. Variation of other properties is also possible.

In some embodiments, an article of footwear or apparel (e.g., a shoe) that is primarily composed of a thermoplastic of substantially the same composition may also have pigments, and/or inkjet inks disposed on the shoe that do not comprise the same thermoplastics. In some embodiments, the overall amount of pigment or inkjet material may by very small (e.g., less than 10 volume %, less than 10 weight % and/or less than 10 mass %) compared to the overall composition of the article of footwear or apparel (e.g., shoe), such that the pigment or inkjet material can still be incorporated into the thermoplastic material during recycling without substantially reducing the material properties of the recycled material. The thermoplastic upper of a shoe, for example, may be recycled into the same or similar type of product (e.g., another article of footwear or article of apparel), or may be recycled into a different product with less rigorous material property requirements (e.g., carpet glue).

In certain embodiments, it may be advantageous to construct at least some portions of the article of footwear (e.g., the upper) or apparel out of transparent or translucent thermoplastic materials. The materials may be 3D-printed, or the materials may be non-3D printed films, or molded parts. Using transparent or translucent materials may facilitate providing coloration using digital processes like inkjet printing. Using transparent and/or translucent materials may facilitate positioning the ink-jetted material on an inner surface of an article of footwear or apparel, and still leaving visible the colorations and/or patterns from the ink-jetted material without leaving the ink-jetted material exposed to an outer surface of the article of footwear or apparel. In such an example, the abrasion resistance of the colored layer may be increased relative to that if the transparent and/or translucent materials were absent. In some cases, it may be advantageous to create articles of footwear with 3D-printed components that are printed onto one or more of the surfaces of the footwear upper. In some cases, the 3D-printed components may be positioned on the external surface of an article of footwear or apparel, e.g., of a shoe. In other cases, the 3D printed components may be positioned on an internal surface of an article of footwear or apparel, e.g., of a shoe.

Figures 23A, 23B:
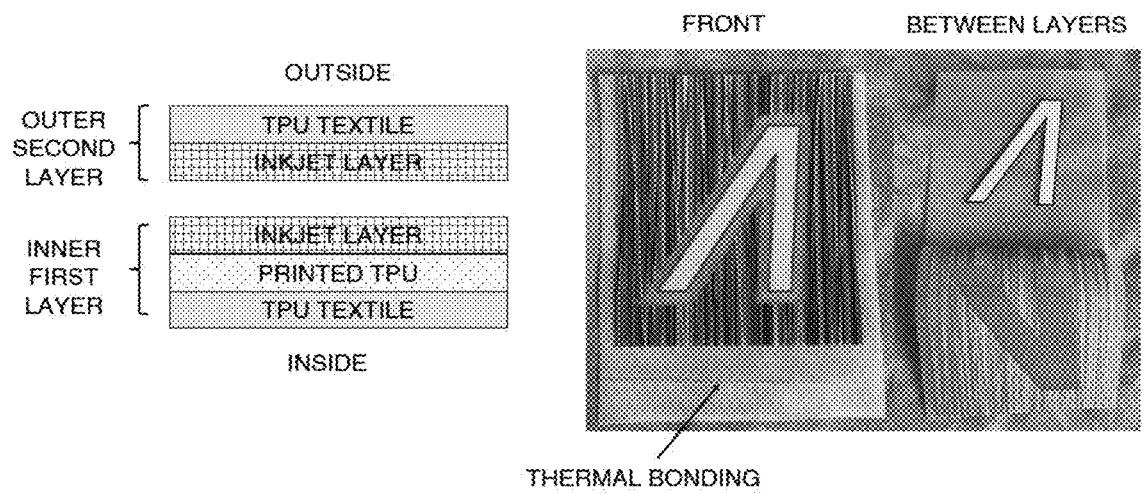
Figure 26A:
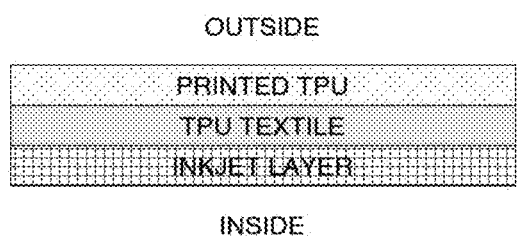
Figure 26B:
Figure 27:
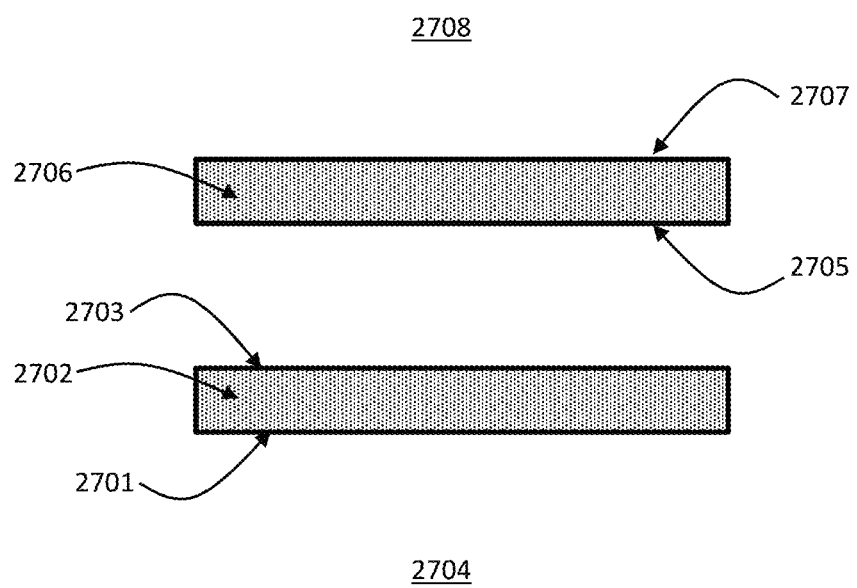
FIG. 27 is a schematic of illustrative textile layers that may be positioned in a variety of configurations with one or more three-dimensionally printed articles and/or inkjet inks, in accordance with some embodiments.

In some embodiments, an article of footwear or apparel (e.g., an athletic footwear upper) may comprise more than one layer of textile (e.g., an external textile layer and an internal textile layer or liner). FIG. 27 is a schematic of illustrative textile layers that may be positioned in a variety of configurations with one or more three-dimensionally printed articles and/or inkjet inks, in accordance with some embodiments. As a non-limiting example, a shoe upper or other article of footwear or article of apparel may comprise a first inner textile layer 2702 (e.g., lower "TPU TEXTILE" layer of FIG. 23A) with a first inner surface 2701 facing the inside 2704 (e.g., "INSIDE" of FIG. 23A) of a shoe or facing the body of a wearer, and a second outer surface 2703 that faces the outside 2708 (e.g., "OUTSIDE" of FIG. 23A) of the shoe or the outside of the article of apparel, but is covered by a second outer layer 2706 of textile (e.g., upper "TPU TEXTILE" layer of FIG. 23A). The outer layer 2706 of textile may have a first inner surface 2705 that faces the second outer surface 2703 of the first inner layer 2702 of textile. The second outer layer 2706 of textile may have a second outer surface 2707 that faces the outside (e.g., "OUTSIDE" of FIG. 23A) of the shoe or faces away from the body of the wearer. In some embodiments, a 3D-printed component may be disposed on the second outer surface 2707 of the second outer layer 2706 of textile. A 3D-printed article (e.g., "PRINTED TPU" layer of FIG. 24A) may be disposed on the first inner surface 2705 of the second outer layer 2706 of textile (e.g., upper "TPU TEXTILE" layer of FIG. 24A). A 3D-printed article may be disposed on the second outer surface 2703 of the first inner layer 2702 of textile (e.g., "PRINTED TPU" layer of FIG. 23A). A 3D-printed article may be disposed on the first inner surface 2701 of the first inner layer 2702 of textile. A 3D-printed article may be disposed on any or all of these layers simultaneously. In some embodiments, an inkjet ink (e.g., the "INKJET LAYER" layers of FIG. 23A) may also be disposed on any of these layers. Inkjet inks may also be disposed on any or all surfaces of the 3D-printed articles.

FIGS. 23A-26B show some non-limiting representative examples of various configurations of layering for textiles, 3D-printed features, and inkjet inks.

In some non-limiting embodiments, it may be advantageous to position the inkjet inks in such a way that they are not directly exposed to the outside surface of an article of footwear or apparel (for increased abrasion resistance), but are still visible from the outside. As a non-limiting example, an inkjet ink (e.g., the "INKJET LAYER" layer of FIG. 26A) may be disposed on the first inner surface of a transparent or translucent textile or film (e.g., "TPU TEXTILE" layer of FIG. 26A), and a three-dimensionally printed article (e.g., "PRINTED TPU" layer of FIG. 26A) may be present on the outer second surface of the outer layer of textile or film. An example of a textile or film that is transparent or translucent may include any textile (e.g., woven, knit, non-woven) or film that is at least 10% optically transparent to light of at least one wavelength ranging between 380 nm and 740 nm, inclusive of the endpoints. A first inner layer of textile or film may or may not also be present. As another non-limiting example, a 3D-printed article (e.g., "PRINTED TPU" layer of FIG. 25A) may be disposed on the first inner surface 2705 of the outer layer 2706 of textile (e.g., "TPU TEXTILE" layer of FIG. 25A), and/or an inkjet ink may also be disposed on at least part of the first inner surface 2705 of the textile, and/or an inkjet ink (e.g., "INKJET LAYER" layer of FIG. 25A) may also be disposed on at least part of the 3D printed article (e.g., "PRINTED TPU" layer of FIG. 25A) on the first inner surface 2705 of the outer layer 2706 of textile (e.g., "TPU TEXTILE" layer of FIG. 25A). In this way it may be possible to see coloration or patterns imparted by the inkjet ink through the outer layer of textile, and/or through the 3D-printed article. As another non-limiting example, a 3D-printed article (e.g., "PRINTED TPU" layer in FIG. 23A) may be disposed on the second outer surface 2703 of the first inner layer 2702 of textile (e.g., lower "TPU TEXTILE" layer in FIG. 23A), and an inkjet ink (e.g., upper "INKJET LAYER" layer in FIG. 23A) may be disposed on the first inner surface 2705 of the second outer layer 2706 of textile (e.g., upper "TPU TEXTILE" layer in FIG. 23A). An inkjet ink (e.g., lower "INKJET LAYER" layer in FIG. 23A) may also be disposed onto the 3D printed article (e.g., "PRINTED TPU" layer in FIG. 23A) on the second outer surface 2703 of the first inner layer 2702 (e.g., lower "TPU TEXTILE" layer in FIG. 23A).

In any of the above embodiments, the textiles, and the 3D-printed articles, may be selected to comprise or consist of substantially the same thermoplastic polymers to aid in the ease of recycling. In some embodiments, any components of the layered structure may be thermally bonded together to change the mechanics of the shoe, or to aid in the assembly or alignment process. In any of the previously discussed embodiments, one or more of the textiles or 3D-printed articles that which the upper comprises or consists of may also be thermally bonded to the bottom of the shoe (e.g., the midsole, the outsole). The thermal bonding may be accomplished using a thermoplastic adhesive of substantially the same chemical composition as the upper materials and the midsole (e.g., the upper materials, the midsole, and the thermoplastic adhesive are all thermoplastic polyurethanes).

It should be noted that the materials may have substantially the same composition, while existing in different form factors with different mechanical properties (e.g., the midsole may comprise or be a thermoplastic polyurethane foam, while the upper textiles comprise or consist of a woven or knit thermoplastic polyurethane textile, while the 3D printed articles comprise or consist of solid thermoplastic polyurethane elastomers that may be printed as solid pieces, or as lattices that may be open-celled or closed-celled). In some embodiments, the upper may be bonded to the bottom of the shoe without the use of an adhesive, and the bonding may be due to locally melting and fusing the thermoplastic materials of substantially the same composition.

It should also be noted that while two or more of the material components of the upper and the bottom unit may have substantially the same composition (e.g., two or more of the material components of the upper and the bottom unit each comprise or consist of thermoplastic polyurethanes), they may not have exactly the same composition (e.g., one component may be a polyether TPU, while another component is a polyester TPU). They may also have different molecular weights. One or more of the materials may also contain, or may have layers disposed on the materials that have, trace elements of materials with different compositions. As a non-limiting example, the textiles comprising the upper may comprise or consist of thermoplastic polyurethanes, and the 3D-printed articles disposed on the textile surfaces may also comprise or consist of thermoplastic polyurethane, but one or more of the textile surfaces and/or the 3D-printed article surfaces may have a substance (e.g., an inkjet ink or a pigment) on the surface and/or embedded inside, that does not comprise or consist of the same material (e.g., the inkjet ink may be an acrylate with pigments loaded inside).

In any of the above embodiments, the 3D-printed article may have two or more portions. In any of these embodiments, there may be a difference in one or more material properties between a first portion and a second portion. Examples of relevant material properties include but are not limited to: stiffness, elastic modulus, flexural stiffness, Shore A hardness, Shore D hardness, Asker C hardness, microindentation hardness, nanoindentation hardness, color, strength, and elastic rebound. In some embodiments, a material property in a first portion may differ by at least 10%, at least 20%, at least 50%, at least 75%, at least 100%, at least 150%, at least 200%, at least 300%, at least 400%, at least 500%, or at least 700% from that of a second portion. As a non-limiting example, a first portion may have a Shore A hardness of less than 70 A, while a second portion may have a Shore A hardness of greater than 85 A. As another non-limiting example, a first portion may have an elastic modulus of less than 12 MPa, while a second portion may have an elastic modulus of greater than 15 MPa.

In some embodiments, the embodiments above may apply to an article of apparel. For example, an article of apparel (e.g., a sports bra), may comprise at least two layers of a thermoplastic textile (an inner layer and an outer layer, each with a first internal surface and a second external surface). A 3D-printed thermoplastic feature may be disposed onto any, some, or all of the surfaces of the article of apparel. In these cases, an inkjet ink or pigment may also be disposed on any, some, or all of these surfaces. As in the footwear example, the article of apparel comprising a 3D-printed article may also have a first and a second portion. The first and second portion of the 3D-printed article disposed on an article of apparel may also have a variation or gradient between a first portion and a second portion. The article of apparel may also be other apparel types beyond sports bras. Other non-limiting examples of articles of apparel include compression clothing such as leggings or shirts, gloves, socks, hats, knee braces, and ankle braces.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article of footwear, comprising:
   an upper, comprising:
      a textile or polymer film; and
      a three-dimensionally printed feature comprising a thermoplastic material;
   wherein the three-dimensionally printed feature is directly attached to the textile or polymer film;
   wherein the majority of the weight of the upper comprises substantially the same thermoplastic material as that of the three-dimensionally printed feature; and
   wherein the three-dimensionally printed feature comprises a first portion and a second portion, wherein there is at least a 10% difference in microindentation hardness between the first portion and the second portion.

2. The article of claim 1, wherein the three-dimensionally printed feature has a gradient in one or more additional material properties.

3. The article of claim 2, wherein each of the one or more additional material properties is selected from the group consisting of: stiffness, tensile elastic modulus, Shore A hardness, Shore D hardness, nanoindentation hardness, flexural modulus, and color.

4. The article of claim 1, wherein the three-dimensionally printed feature has a section that is a single integrated material, and the section has the first portion and the second portion.

5. The article of claim 1, wherein the three-dimensionally printed feature comprises a first portion and a second portion, wherein there is at least a 10% difference in tensile elastic modulus between the first portion and the second portion.

6. The article of claim 1, wherein the three-dimensionally printed feature comprises at least a section that is a single integrated material and has a gradient in tensile elastic modulus between the first portion and the second portion.

7. The article of claim 1, wherein the three-dimensionally printed feature is attached to the textile or film without the use of an adhesive.

8. The article of claim 1, wherein at least a portion of the upper has a pigment containing inkjet ink disposed on at least one surface of the upper.

9. The article of claim 8, wherein the pigment containing inkjet ink is disposed on an internal surface of a first textile, wherein the internal surface is at least partially visible through at least the first textile that is at least partially transparent.

10. The article of claim 1, wherein the three-dimensionally printed feature is at least partially transparent, and the three-dimensionally printed feature has a pigment containing inkjet ink disposed on the feature.

11. The article of claim 1, wherein the thermoplastic material which the majority of the weight of the upper comprises is a thermoplastic polyurethane.

12. The article of claim 1, wherein at least a portion of the three-dimensionally printed feature is an open-celled lattice.

13. The article of claim 1, wherein the three-dimensionally printed feature comprises a gradient in tensile elastic modulus.

14. The article of claim 1, wherein the first portion has a Shore A hardness below 75 A, and the second portion has a Shore A hardness greater than 85 A; and wherein the three-dimensionally printed feature is a single integrated material.

15. The article of claim 1, wherein the three-dimensionally printed feature comprises a thermoplastic polyurethane.

16. An article of apparel, comprising:
a textile or polymer film; and
a three-dimensionally printed feature comprising a thermoplastic material;
wherein the three-dimensionally printed feature is directly attached to the textile or polymer film;
wherein the majority of the weight of the article of apparel comprises substantially the same thermoplastic material as that of the three-dimensionally printed feature; and
wherein the three-dimensionally printed feature comprises a first portion and a second portion, wherein there is at least a 10% difference in microindentation hardness between the first portion and the second portion.

17. An article of footwear, comprising:
a three-dimensionally printed feature comprising an open-celled lattice; and
a closed cell foam;
wherein the three-dimensionally printed feature is at least partially embedded inside of the closed cell foam; and
wherein at least a portion of the open-celled lattice has an Asker C hardness less than Asker C 50.

* * * * *